United States Patent
Kitagawa et al.

[11] Patent Number: 6,138,116
[45] Date of Patent: Oct. 24, 2000

[54] METHOD AND APPARATUS FOR RETRIEVING DATA

[75] Inventors: Takashi Kitagawa, Tsukuba; Yasushi Kiyoki, Tsuchiura, both of Japan

[73] Assignees: Canon Kabushiki Kaisha, Tokyo; T. Kitagawa; Y. Kiyoki, both of Ibaraki-ken, all of Japan

[21] Appl. No.: 08/904,149

[22] Filed: Jul. 31, 1997

[30] Foreign Application Priority Data

Aug. 1, 1996 [JP] Japan ................................ 8-203472

[51] Int. Cl.[7] .............................................. G06F 17/30
[52] U.S. Cl. .............................. 707/5; 707/3; 707/532
[58] Field of Search .................................. 707/3, 5, 103, 707/526, 101, 532; 706/62; 704/9

[56] References Cited

U.S. PATENT DOCUMENTS

| | | | |
|---|---|---|---|
| 4,839,853 | 6/1989 | Deerwester et al. | 707/5 |
| 4,849,898 | 7/1989 | Adi | 364/419 |
| 5,263,120 | 11/1993 | Bickel | 706/62 |
| 5,544,352 | 8/1996 | Egger | 707/5 |
| 5,559,940 | 9/1996 | Hustson | 707/526 |
| 5,619,709 | 4/1997 | Caid et al. | 707/532 |
| 5,630,125 | 5/1997 | Zellweger | 707/103 |
| 5,649,193 | 7/1997 | Sumita et al. | 707/103 |
| 5,778,362 | 7/1998 | Deerwester | 707/5 |
| 5,873,056 | 7/1998 | Liddy et al. | 704/9 |

FOREIGN PATENT DOCUMENTS 386 825 A1  9/1990  European Pat. Off. .

Primary Examiner—Wayne Amsbury
Assistant Examiner—Thuy Pardo
Attorney, Agent, or Firm—Fitzpatrick, Cella, Harper & Scinto

[57] ABSTRACT

A semantic data processing apparatus for retrieving one or a plurality of words, having a close meaning to that of an inputted word, in consideration of context or condition, comprises: a communication apparatus 101 for inputting a keyword and context word group; a projective transformation generating module 104 for transforming the inputted keyword and context word group into a keyword vector and a context word vector group indicative of respective meanings, and generating a projector which projects the keyword and a comparison-subjected vector group into a subspace corresponding to the context word group, in a semantic space which is generated in correspondence with a predetermined space generation word, on the basis of the obtained context word vector group; an input/output apparatus 102 for inputting a comparison-subjected word group; a comparison-subjected word group mapping module 107 for transforming the inputted comparison-subjected word group into a comparison-subjected vector group indicative of meanings of a comparison-subjected word; and a basic processing module 103 for projecting the keyword vector and comparison-subjected vector group into the subspace by utilizing the projector, calculating a distance between each vector of the comparison-subjected vector group and the keyword vector in the subspace, and rearranging the comparison-subjected word group in the order of the distance to be outputted.

36 Claims, 34 Drawing Sheets

FIG. 9

BASIC CHARACTERISTIC REPRESENTATION OF "industry"
$w''_j = (0\ 0\ ...\ 1\ ...\ 0\ ...\ 1\ ...\ 0\ ...\ 1\ ...)^T$ $$A = \begin{pmatrix} 0 & 1 & ... & 1 & ... & 0 & ... & 0 & ... & 0 & ... & 0 & ... \\ 1 & 1 & ... & -1 & ... & 0 & ... & -1 & ... & 0 & ... & 0 & ... \\ 0 & 0 & ... & \cdot & ... & 0 & ... & 0 & ... & 1 & ... & 1 & ... \\ \cdot & \cdot & & \cdot & & \cdot & & \cdot & & \cdot & & \cdot & \\ \cdot & \cdot & & \cdot & & \cdot & & \cdot & & \cdot & & \cdot & \\ 0 & 0 & ... & 0 & ... & 0 & ... & 0 & ... & 1 & ... & 1 & ... \end{pmatrix}$$

ADD LATERAL VECTOR, OBTAINED BY TRANSPOSING BASIC CHARACTERISTIC REPRESENTATION VECTOR OF THE j-TH SPACE GENERATION WORD, TO DATA MATRIX HAVING j-1 ROWS AND N COLUMNS, AND GENERATE DATA MATRIX HAVING j ROWS AND N COLUMNS $$A = \begin{pmatrix} 0 & 1 & ... & 1 & ... & 0 & ... & 0 & ... & 0 & ... & 0 & ... \\ 1 & 1 & ... & -1 & ... & 0 & ... & -1 & ... & 0 & ... & 0 & ... \\ 0 & 0 & ... & \cdot & ... & 0 & ... & 0 & ... & 1 & ... & 1 & ... \\ \cdot & \cdot & & \cdot & & \cdot & & \cdot & & \cdot & & \cdot & \\ 0 & 0 & ... & 0 & ... & 0 & ... & 0 & ... & 1 & ... & 1 & ... \\ 0 & 0 & ... & 1 & ... & 0 & ... & 1 & ... & 0 & ... & 1 & ... \end{pmatrix}$$

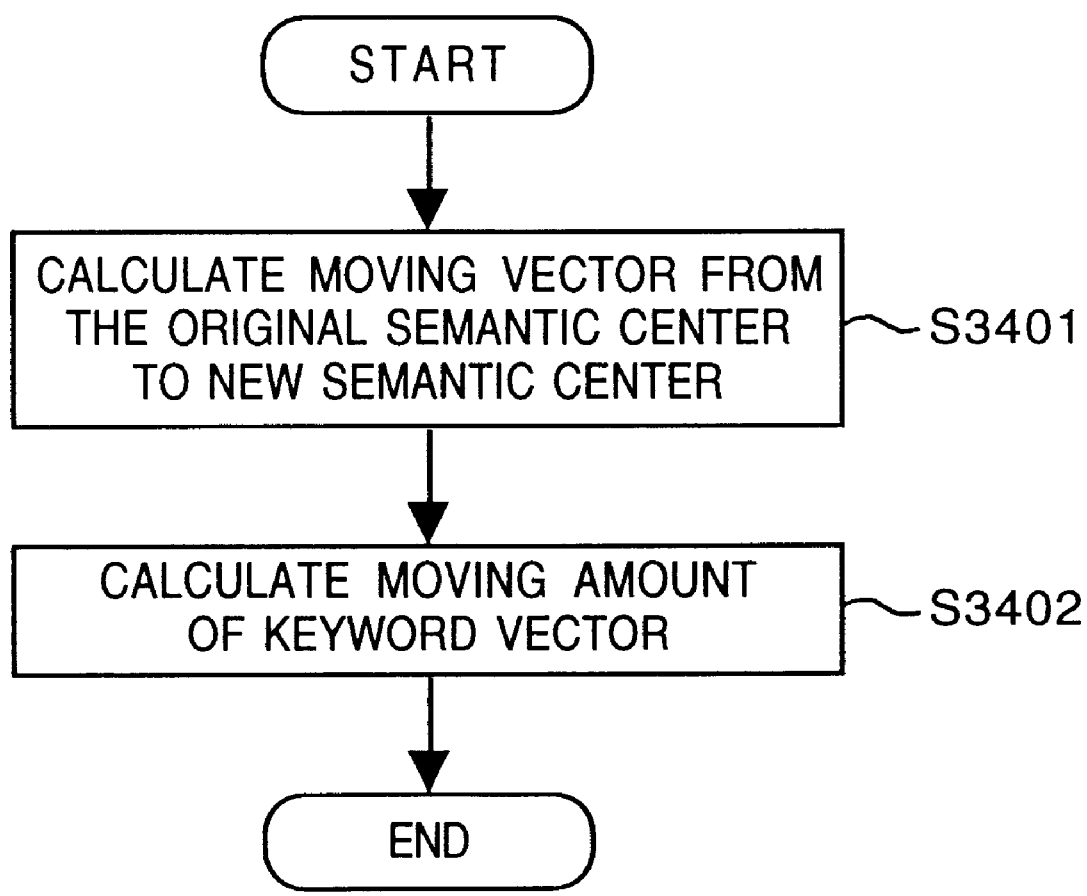

METHOD AND APPARATUS FOR RETRIEVING DATA

BACKGROUND OF THE INVENTION

The present invention relates to a data retrieving apparatus and method thereof and, more particularly, to a database system or an interface system between a database system and users, and method of retrieving data.

Associative retrieval is performed as primary basic operation of data retrieval in a database system. The associative retrieval performed in the general database system is pattern matching retrieval operation.

With respect to semantic relation between data, identity or difference of data has been determined on the basis of description written statically and explicitly with respect to the relation between data.

However, in the retrieving operation using pattern matching, a user is unable to retrieve data having the same meaning but represented by the different representation forms, or data having similar meanings. Moreover, the pattern matching cannot deal with polysemy of words.

Furthermore, in the determining operation of determining identity and difference of data on the basis of the statically-described relation, the determination is made with some ambiguousness. For instance, in a method of inquiring for synonyms utilizing a thesaurus, synonyms are statically decided at the time of designing the thesaurus, and the definition of synonymity is ambiguous.

However, it is considered that the semantic identity and difference between data dynamically changes depending on the context and condition. Therefore, in the above-described determination of determining identity and difference of data based on the statically-provided relations, ambiguousness cannot be excluded.

SUMMARY OF THE INVENTION

The present invention has been made in consideration of the above situation, and has as its object to provide a semantic data processing method and apparatus for easily determining semantic identity and difference between data which tends to dynamically change in accordance with context or condition of the data.

Furthermore, the present invention applies the foregoing semantic data processing method to perform retrieval operation on a database, and provides a data retrieving method and apparatus which is capable of performing the most suitable retrieval operation corresponding to a keyword designated by a user, even if the user does not know the meaning of the keyword on the database.

Moreover, the present invention provides a data retrieving method and apparatus which is capable of performing retrieval operation at high speed by projecting a keyword designated by a user upon a subspace of a semantic space, whereby narrowing down retrieval object.

According to an aspect of the present invention, the semantic data processing apparatus comprises: first inputting means for inputting a keyword and a context word group; first transforming means for transforming the keyword inputted by the first inputting means into a keyword vector which has elements corresponding to a predetermined characteristic word group to represent a meaning of the keyword; second transforming means for transforming the context word group into a context word vector group by transforming each word of the context word group inputted by the first inputting means into a vector which has elements corresponding to a predetermined characteristic word group to represent a meaning of the word; projector generating means for generating a projector for projecting the keyword vector and a comparison-subjected vector group into a subspace corresponding to the context word group, in a semantic space which is generated in correspondence with a predetermined space generation word group, on the basis of the context word vector group obtained by the second transforming means; second inputting means for inputting a comparison-subjected word group; third transforming means for transforming the comparison-subjected word group into the comparison-subjected vector group by transforming each word of the comparison-subjected word group inputted by the second inputting means into a vector which has elements corresponding to a predetermined characteristic word group to represent a meaning of the word; projecting means for projecting the keyword vector and the comparison-subjected vector group in the subspace by utilizing the projector generated by the projector generating means; calculating means for calculating a correlation amount between each vector of the comparison-subjected vector group, projected by the projecting means, and the keyword vector; and selecting means for selecting at least one word from the comparison-subjected word group on the basis of the correlation amount calculated by the calculating means.

According to an aspect of the present invention, the semantic data processing method comprises: a first inputting step of inputting a keyword and a context word group; a first transforming step of transforming the keyword inputted in the first inputting step into a keyword vector which has elements corresponding to a predetermined characteristic word group to represent a meaning of the keyword; a second transforming step of transforming the context word group into a context word vector group by transforming each word of the context word group inputted in the first inputting step into a vector which has elements corresponding to a predetermined characteristic word group to represent a meaning of the word; a projector generating step of generating a projector for projecting the keyword vector and a comparison-subjected vector group into a subspace corresponding to the context word group, in a semantic space which is generated in correspondence with a predetermined space generation word group, on the basis of the context word vector group obtained in the second transforming step; a second inputting step of inputting a comparison-subjected word group; a third transforming step of transforming the comparison-subjected word group into the comparison-subjected vector group by transforming each word of the comparison-subjected word group inputted in the second inputting step into a vector which has elements corresponding to a predetermined characteristic word group to represent a meaning of the word; a projecting step of projecting the keyword vector and the comparison-subjected vector group in the subspace by utilizing the projector generated in the projector generating step; a calculating step of calculating a correlation amount between each vector of the comparison-subjected vector group, projected in the projecting step, and the keyword vector; and a selecting step of selecting at least one word from the comparison-subjected word group on the basis of the correlation amount calculated in the calculating step.

According to the present invention, it is possible to easily determine semantic identity and difference between data which tends to dynamically change in accordance with context or condition.

Furthermore, even if a user does not know a set of keywords used in a database, the user is able to specify an arbitrary keyword. Then, a keyword which is semantically closest to the specified arbitrary keyword is selected from the set of keywords used in the database, and retrieving operation is performed in the database based on the selected keyword.

Moreover, upon selecting keyword candidates which are semantically close to the keyword specified by the user, search is performed while projecting upon a subspace of the semantic space; thus, the keyword candidates subjected to processing is dramatically decreased. As a result, it is possible to greatly improve the processing speed.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follows the description for determining the scope of the invention.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 9 is an explanatory view showing data matrix updating process;

FIG. 34 is a flowchart showing processing of keyword vector correction by the learning mechanism.

DETAILED DESCRIPTION OF THE PREFERRED EMBODIMENTS

Preferred embodiments of the present invention will be described in detail in accordance with the accompanying drawings.

First Embodiment

Figure 1:
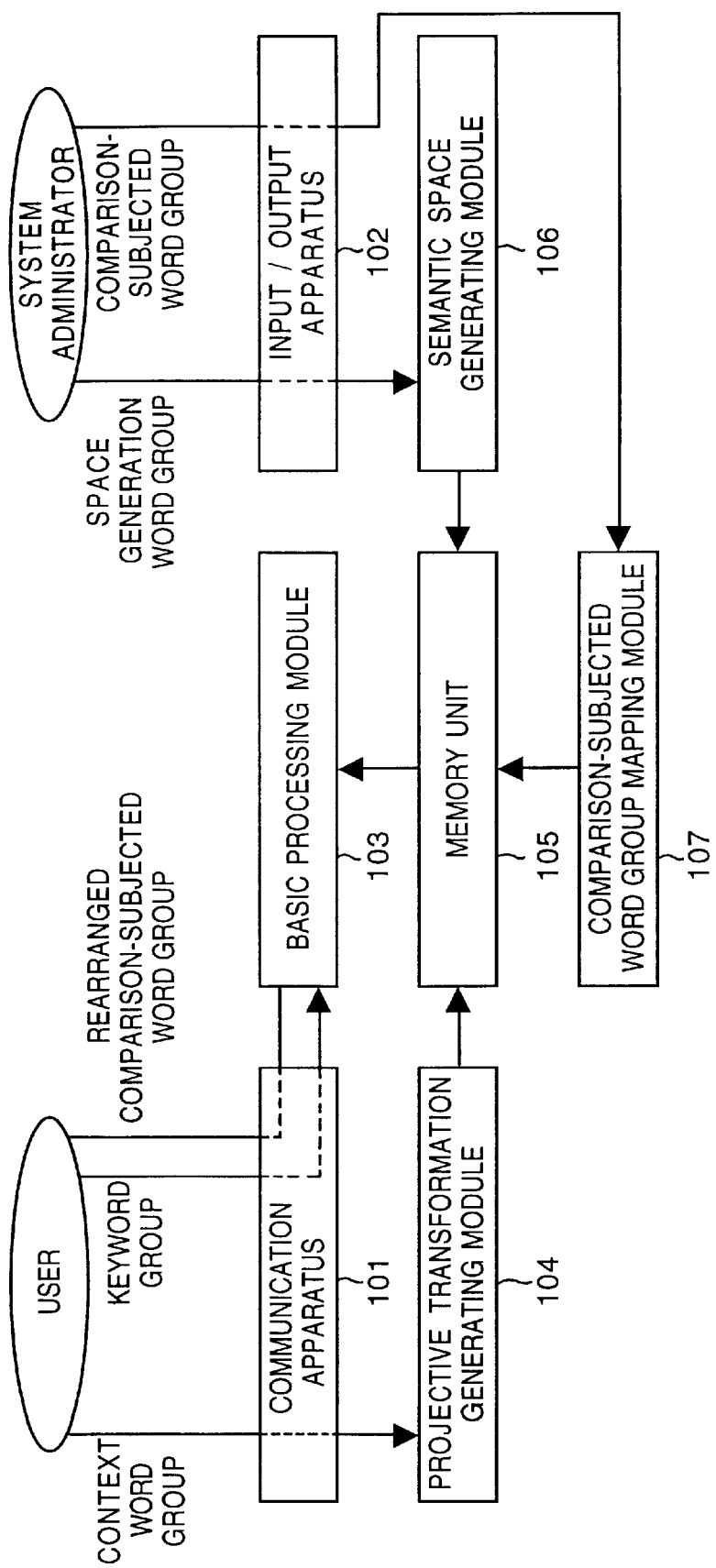
FIG. 1 is a block diagram showing a structure of the first embodiment.

FIG. 1 is a block diagram showing functional structure of a data processing apparatus provided as the first embodiment of the present invention. Each module of the apparatus may be a device including a dedicated program memory and a processor; alternatively, plural function modules may be realized by having a common CPU which executes programs for each function stored in a ROM or disc memory or the like, or by executing control programs for controlling specific hardware corresponding to each of the functions, so long as the functions which will be described below are realized.

Referring to FIG. 1, a brief process of operations for using the data processing apparatus is shown hereinafter.

Initially, the system administrator inputs a space generation word group, and then a semantic space and a semantic space transformation matrix, which transforms each word in the semantic space, etc. are generated by using the inputted space generation word group (semantic space generating module 106). Next, the system administrator inputs a comparison-subjected word group used in each of data bases, and then a comparison-subjected vector group which is able to be used in common within the apparatus is generated (comparison-subjected word group mapping module 107).

An user inputs a context word group representing a scope of retrieved object, e.g. COMPUTER, MEDICAL, FOOD and so on. A surface in the semantic space including an object which the user intends to retrieve is recognized based on the inputted context word group, and then a semantic center and a projector by which a keyword is projected to the subspace are generated (projective transformation generating module 104). Sequentially, the user inputs a keyword group, and then the keyword group is projected to the subspace by using the semantic center and the projector. Simultaneously, the comparison-subjected vector group is projected to the subspace similarly, a distance between each of the projected keyword group and the projected comparison-subjected vector group is calculated and then a comparison-subjected word group is selected as a word group by using which it is possible to retrieve an object required by the user most suitably (basic processing module 103).

The selected word group is used to retrieve an object from the specific data base.

Figure 2:
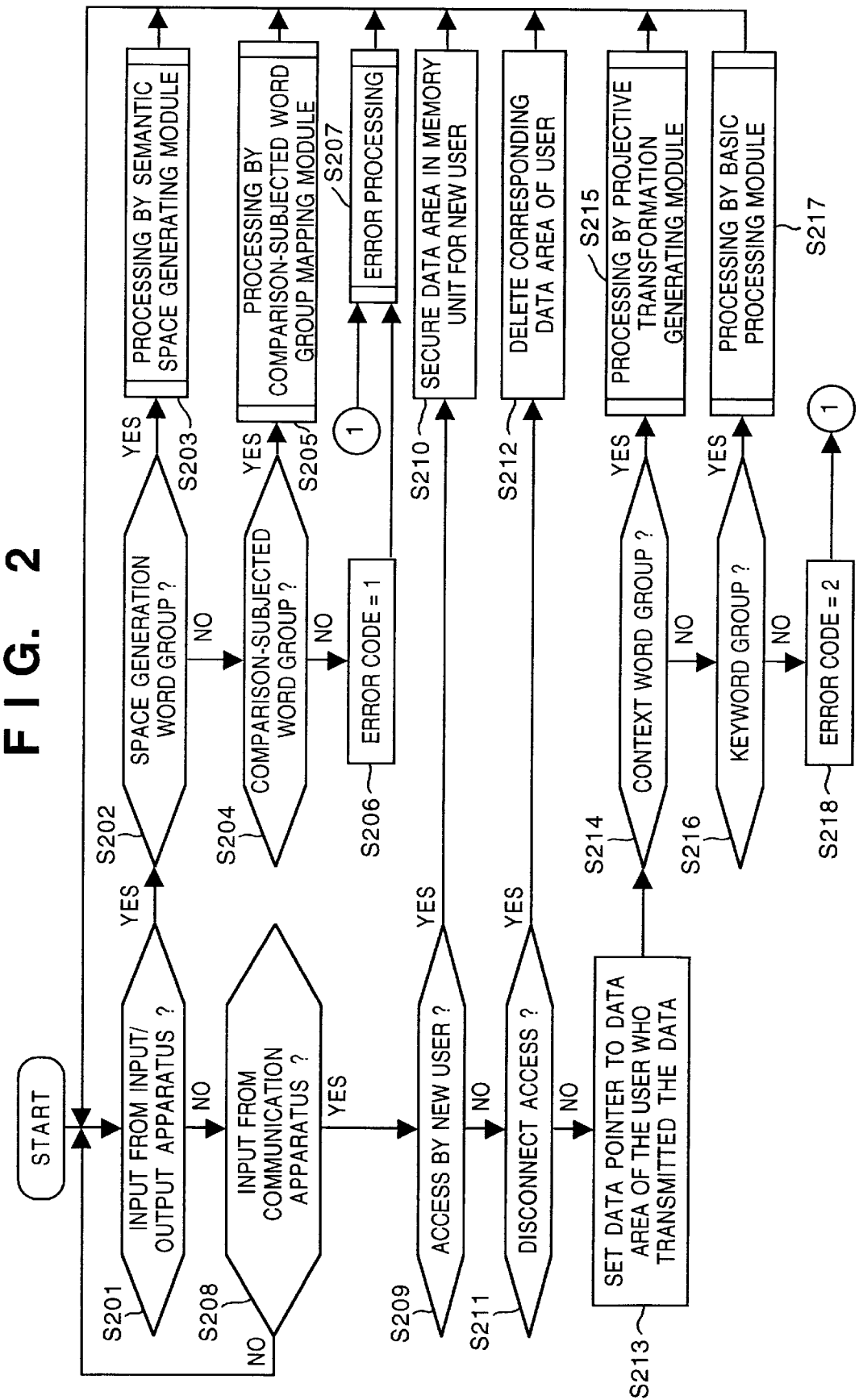
FIG. 2 is a flowchart describing the processing performed by the first embodiment.
Figure 4:
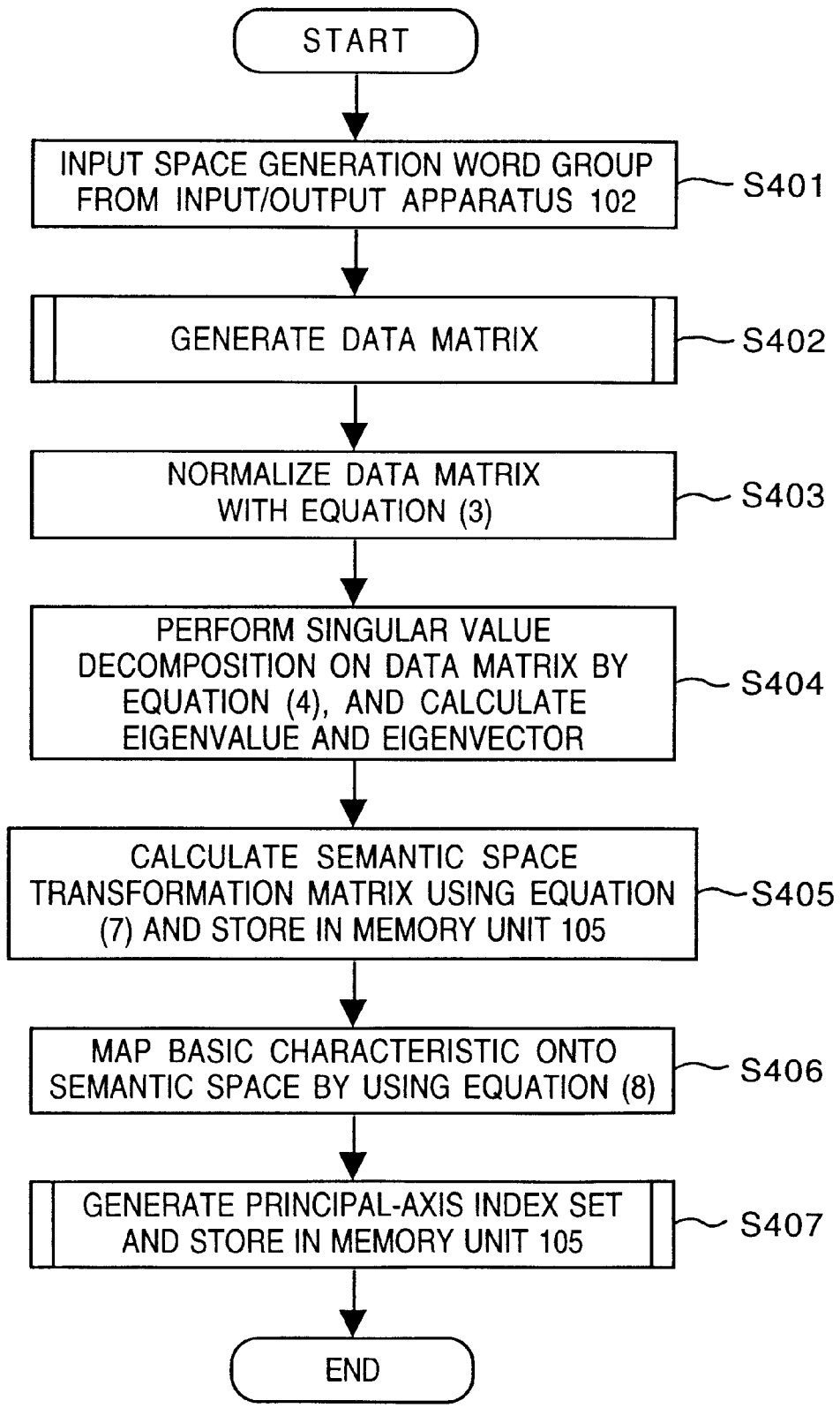
FIG. 4 is a flowchart describing the processing of the semantic space generating module.
Figure 16:
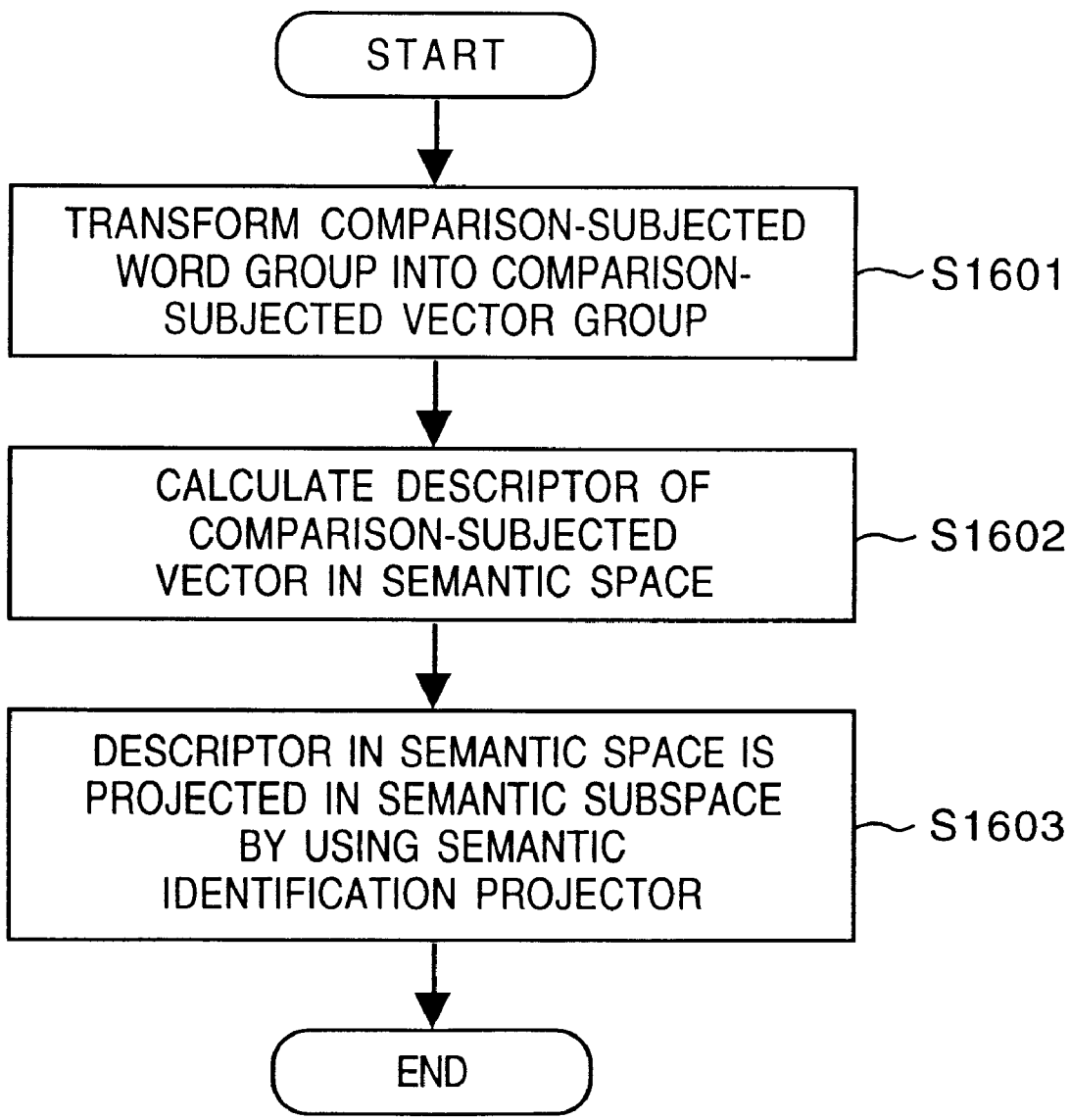
FIG. 16 is a flowchart showing processing of the comparison-subjected word group mapping module.
Figure 19:
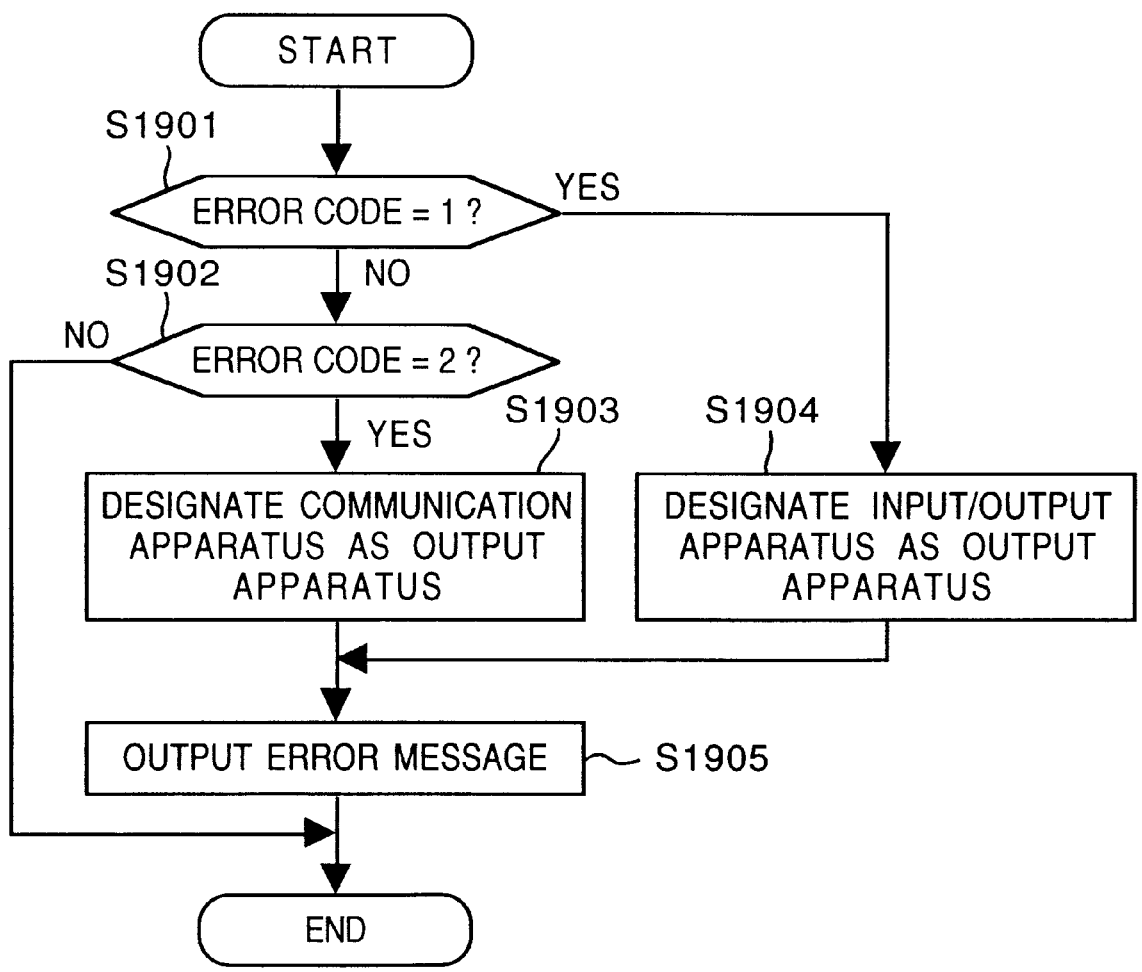
FIG. 19 is a flowchart of error processing.

FIG. 2 is a flowchart showing the processing steps of the system according to the present embodiment. When an input/output apparatus 102 inputs data, processing proceeds from step S201 to step S202. If the inputted data is a space generation word group, processing which will be described later with reference to FIG. 4 is executed by a semantic space generating module 106 (step S202–S203). Meanwhile, if the inputted data is a comparison-subjected word group, processing which will be described later with reference to FIG. 16 is executed by a comparison-subjected word group mapping module 107 (step S204–S205). For other inputted data, an error code 1 is set, and error processing, which will be described later with reference to FIG. 19, is executed (step S206–S207).

Meanwhile, upon receiving data from the communication apparatus 101, it is determined in step S209 whether or not the access is performed by a new user. Herein, the new user means users other than those who are currently performing retrieving operation. If it is determined that the access is performed by a new user, a data area is allocated in a memory unit 105 for the new user in step S210, and the processing returns to step S201.

If it is determined in step S209 that the access is not performed by a new user, it is determined in step S211 whether or not the data is a command for disconnecting the access. If so, the corresponding data area for the user is released in step S212 and the processing returns to step S201. If a command other than an access-disconnect command is sent by an existing user, a data pointer is set in the corresponding data area of the user in step S213.

Figure 18:
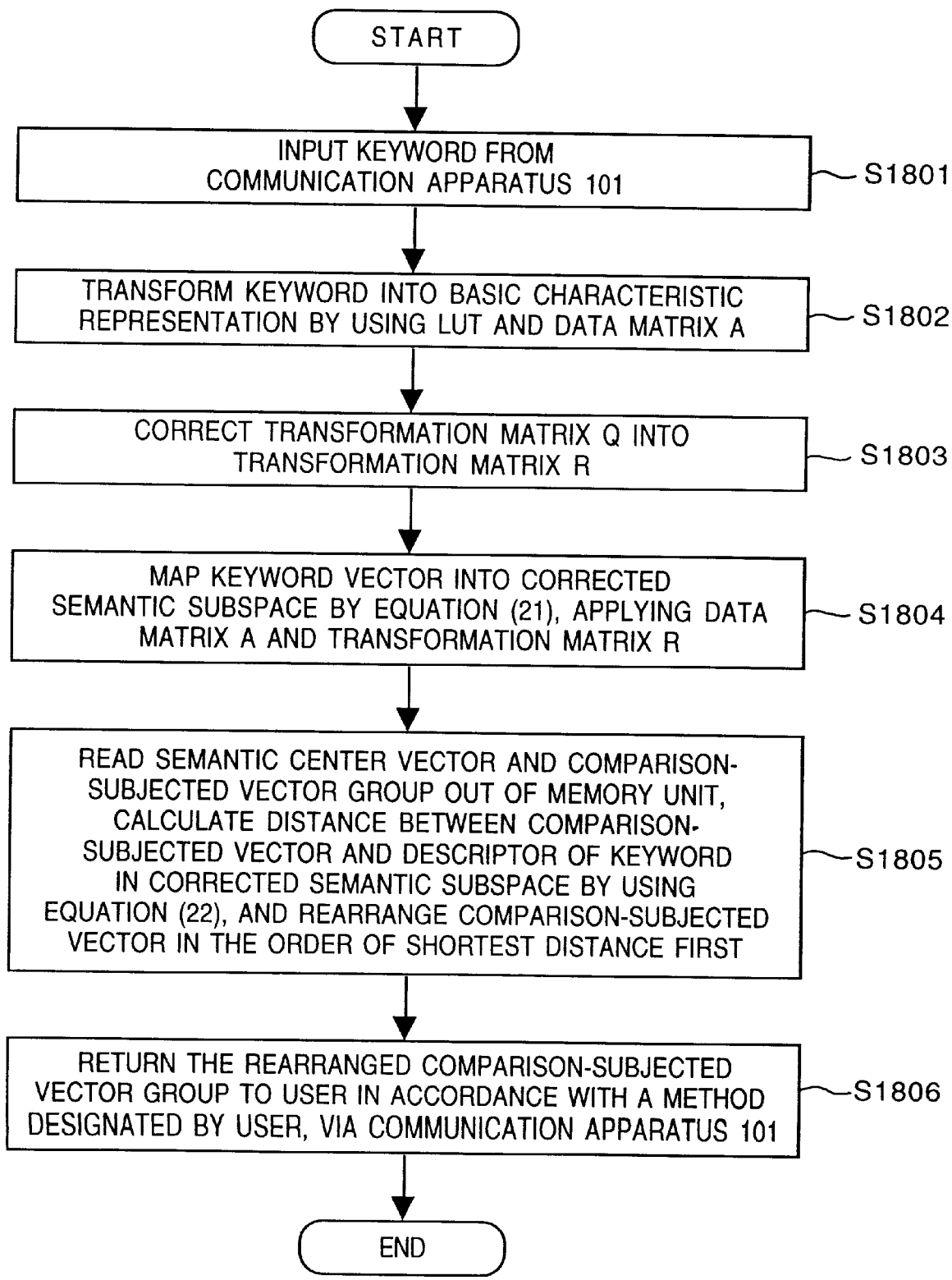
FIG. 18 is a flowchart showing processing of the basic processing module.

If the inputted data is a context word group, processing which will be described later with reference to FIG. 4 is executed by the projective transformation generating module 104 (step S214–S215). If the inputted data is a keyword group, processing which will be described later with reference to FIG. 18 is executed by the basic processing module 103 (step S216–S217). For other inputted data, an error code 2 is set, and the error processing, which will be described later with reference to FIG. 19, is executed (step S218 and S207).

Hereinafter, configuration of each module of the system according to the present invention and the processing steps will be described.

<Communication Apparatus 101>

Referring to FIG. 1, a communication apparatus 101, connected to a data processing apparatus and an external apparatus via a communication line, controls input/output of data between the data processing apparatus and external apparatus. For instance, the communication apparatus 101 transfers a context word group, transmitted by a user apparatus via the communication line, to a projective transformation generating module 104, and transfers a keyword group to a basic processing module 103. In addition, a retrieving candidate word group outputted by the basic processing module 103 is outputted to the user apparatus or a database via the communication line.

<Input/Output Apparatus 102>

The input/output apparatus 102 is provided to execute direct input/output to the data processing apparatus. The input/output apparatus 102 includes a keyboard and a mouse for inputting a space generation word group to the semantic space generating module 106, or for inputting a comparison-subjected word group to the comparison-subjected word group mapping module 107, or for instructing to execute commands. The input/output apparatus 102 also includes a display for displaying error messages or the like transmitted by each module.

<Memory unit 105>

The memory unit 105 includes: a RAM for temporarily storing data generated in the process of various processing and programs and data read out of supplemental memory medium; a ROM for storing control programs and data; and a supplemental memory unit for storing, in a non-volatile manner, programs and data by utilizing hard disc, floppy disc or the like. Programs corresponding to various processing steps which will be described later with reference to flowcharts are also stored in the memory unit 105.

<Semantic Space Generating Module 106>

Figure 3:
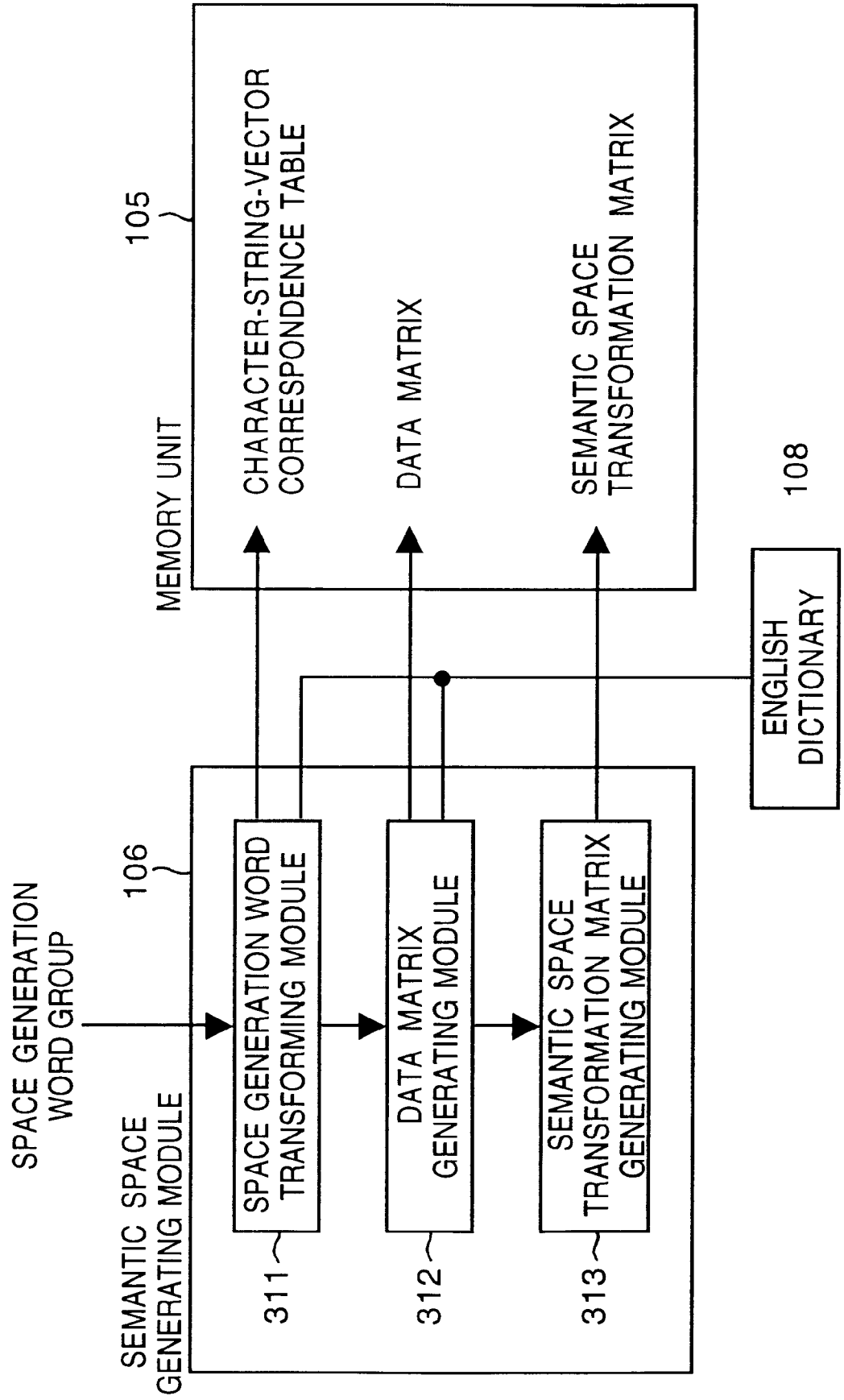
FIG. 3 is a block diagram showing a configuration of a semantic space generating module.

FIG. 3 is a block diagram showing configuration of the semantic space generating module 106. In the semantic space generating module 106, a space generation word transforming module 311 and a data matrix generating module 312 respectively calculate a character-string-and-vector correspondence table and a data matrix (to be described later) by using an English dictionary 108 on the basis of a set of space generation word group inputted from the input/output apparatus 102. The calculated character-string-and-vector correspondence table and the data matrix are stored in the memory unit 105. Furthermore, a semantic space transformation matrix generating module 313 calculates a semantic space transformation matrix by applying normalization, singular-value decomposition or the like to the data matrix, and the calculated value is stored in the memory unit 105.

Hereinafter, calculation method of calculating the character-string-and-vector correspondence table, data matrix and semantic space transformation matrix is described with reference to the flowchart shown in FIG. 4.

In step S401, a space generation word group is inputted through the input/output apparatus 102. The space generation word group having M character strings forms a set of words assumed to be used in the database subjected to designing. The space generation word w is transformed into a form (hereinafter referred to as a generating-word instructing vector) suitable to be processed by a computer.

The space generation word w is transformed into a generating-word instructing vector w' in the following manner. Assuming if a character string w="aback" is located in the eighth position of the M space generation word group as a prime word of the English dictionary, an M-dimensional vector $(000000010\ldots 0)^T$, where the eighth element is 1 and other elements are 0, is generated. A correspondence table (hereinafter referred to as an LUT) which shows the correspondence between character strings indicative of space generation words and generating-word instructing vector, is generated, and stored in the memory unit 105.

Figure 7:
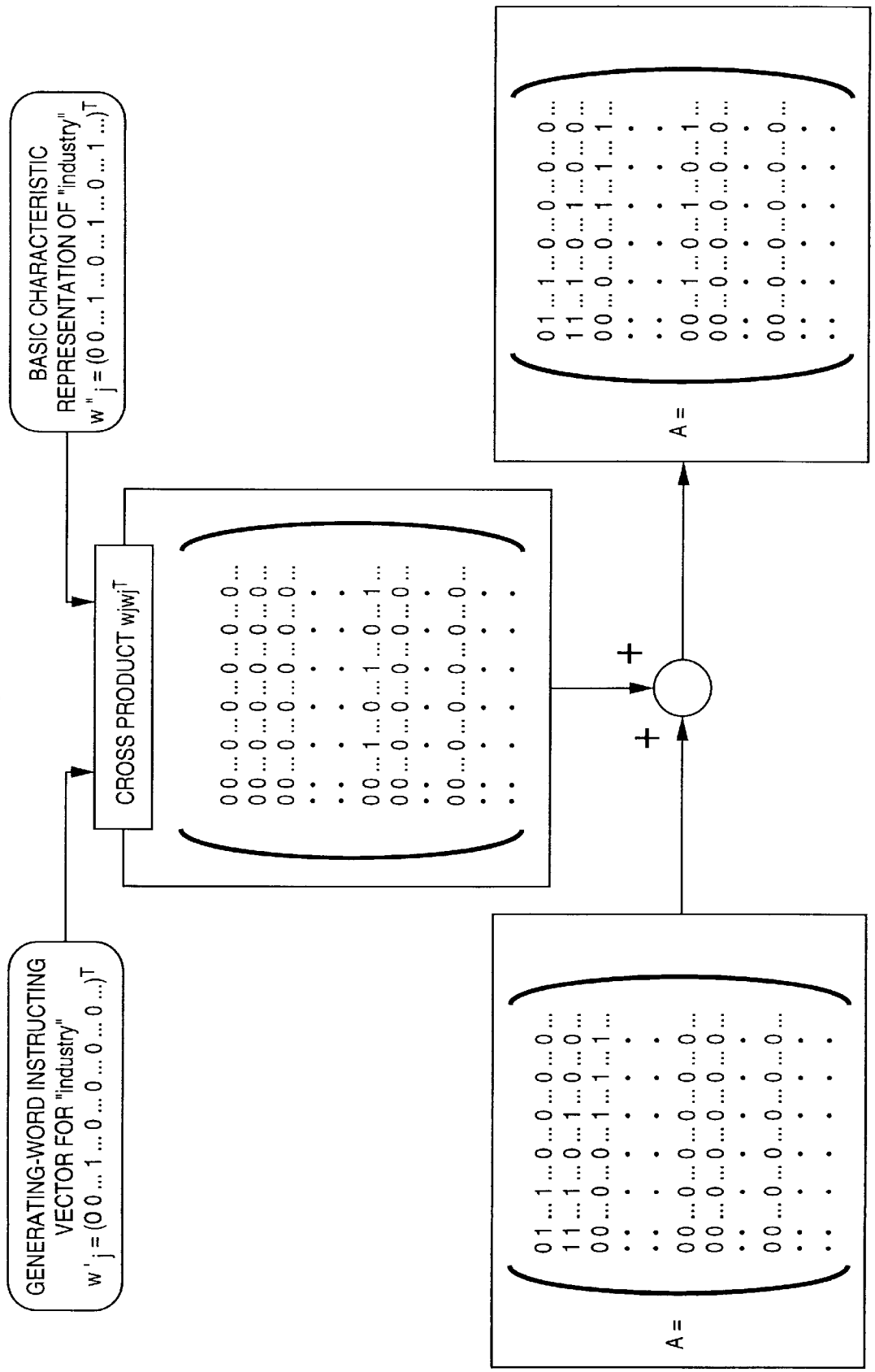
FIG. 7 is an explanatory view showing data matrix updating process.

In step S402, data matrix is generated on the basis of the English dictionary 108 (See FIG. 7). Herein, the data matrix is defined by a matrix A (matrix having M rows and N columns) in the following equation, utilizing the outer product of the M number of generating-word instructing vector $w'_j$ (M dimensional vector) and corresponding basic characteristic representation $w''_j$ (N dimensional vector).

$$A = \sum_{j=1}^{M} w'_j w''^T_j \tag{1}$$

Alternatively, where $$w'_j = (w'_{j,1} \ w'_{j,2} \ \ldots \ w'_{j,m})^T$$
$$w''_j = (w''_{j,1} \ w''_{j,2} \ \ldots \ w''_{j,N})^T$$

$$A = \sum_{j=1}^{M} \begin{pmatrix} w'_{j,1} \\ w'_{j,2} \\ w'_{j,M} \end{pmatrix} (w''_{j,1} \ w''_{j,2} \ldots w''_{j,N}) \tag{2}$$

In the equation (2), as shown in FIG. 7, the sum A of the outer product $w'_1 w''^T_1, w'_2 w''^T_2, \ldots, w'_{j-1} w''^T_{j-1}$, is added to the newly calculated outer product $w'_j w''^T_j$, and the operation of updating A is repeated until j=M.

Figure 5:
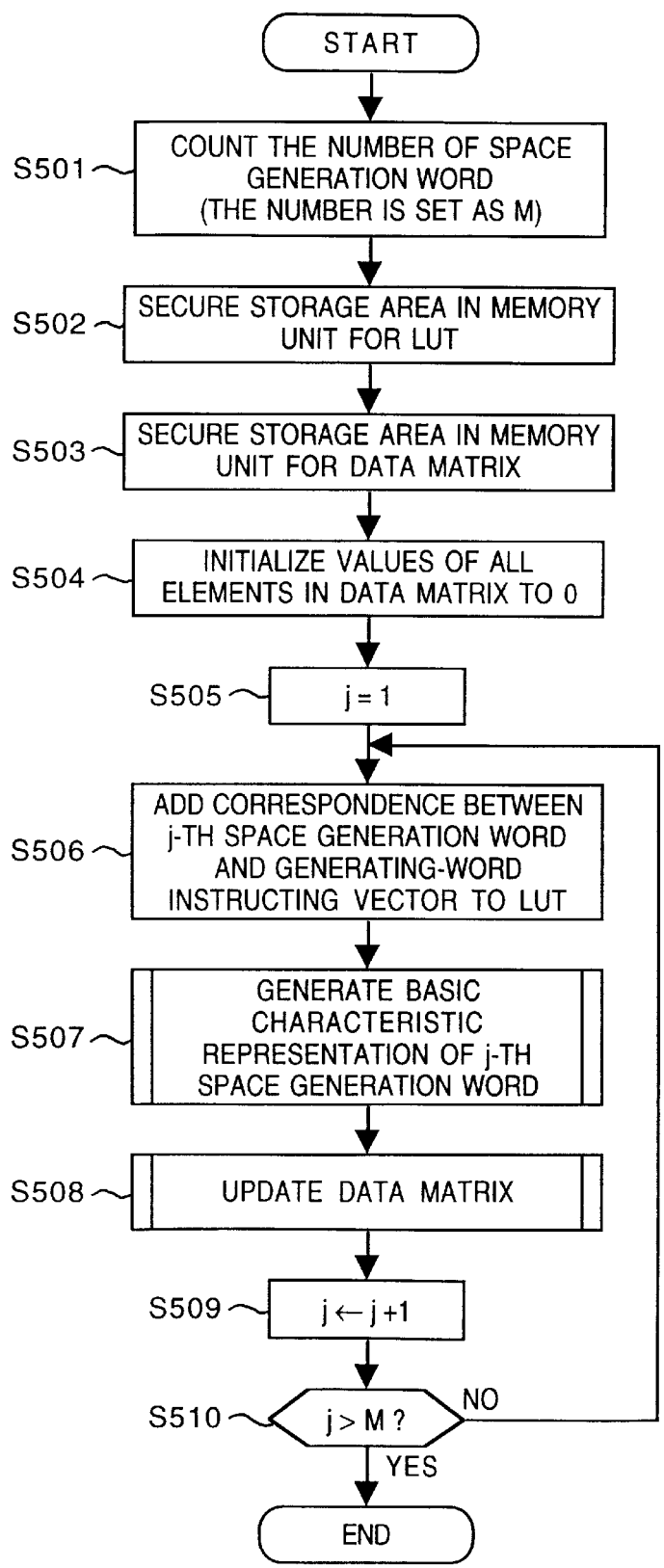
FIG. 5 is a flowchart describing the processing for generating a data matrix.

Generation process of data matrix will be described with reference to FIG. 5.

In step S501, the number of space generation word is counted, and the number is set as M. In step S502, a storage area for the LUT is allocated in the memory unit 105. In step S503, a storage area for the data matrix is allocated in the memory unit 105. In step S504, values of all elements in the data matrix in the allocated storage area are initialized to 0. In step S505, j is set to 1. In step S506, a correspondence between the j-th space generation word and generating-word instructing vector is added to the LUT. In step S507, basic characteristic representation of the j-th space generation word is generated in the steps to be described later with reference to FIG. 6. In step S508, the j-th basic characteristic representation is added as the j-th row to the current data matrix (matrix having j−1 rows and N columns), to obtain the new data matrix (having j rows and N columns). In step S509, j←j+1 is executed. In step S510, it is determined if j>M is satisfied, and if so, the processing ends; otherwise the processing returns to step S506.

In the present embodiment, a dictionary which includes the space generation words as prime words and which explains all the prime words with a set of relatively small number of words, for instance, Longman Dictionary of Contemporary English (hereinafter referred to as LDCE), The General Basic English Dictionary (hereinafter referred to as GBED) and the like, is used. The basic words (2000 words in the case of LDCE, and 850 words in the case of GBED), used in such dictionary, are used as the basic characteristic group. The generating-word instructing vector represented by the basic characteristic group is defined as basic characteristic representation (space generation vector). Selection of the basic characteristic group is determined by trade-off between expression capacity of keywords and the scale of the system. In other words, the larger the number of words of the basic characteristic group, the more meanings can be expressed. On the other hand, the memory capacity and calculation time required by the system are increased.

Figure 6:
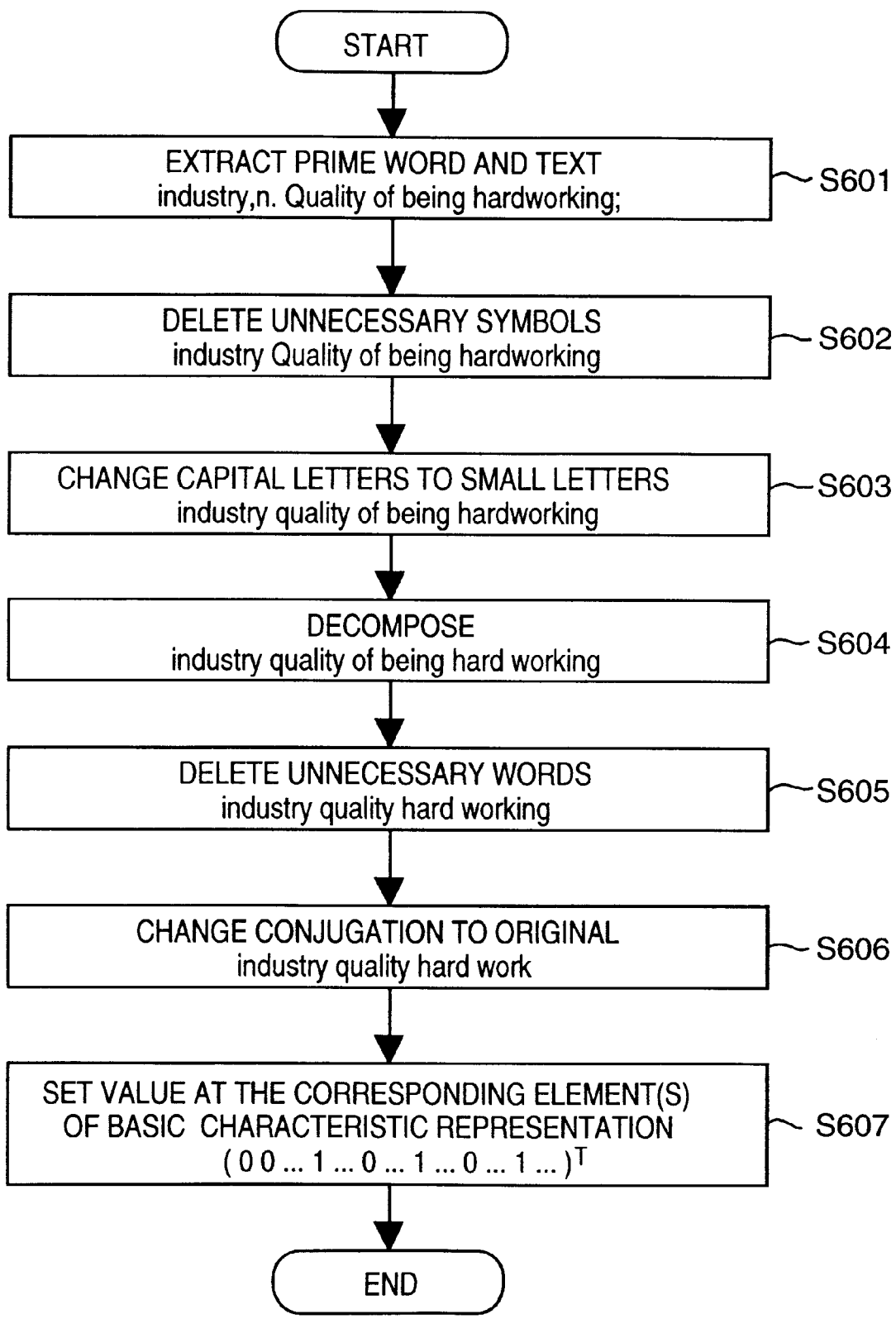
FIG. 6 is an explanatory view showing the process of generating a basic characteristic representation.

The basic characteristic representation $w''_j$ corresponding to the generating-word instructing vector $w'_j$ is generated by, for instance, the processing steps shown in the flowchart in FIG. 6.

In step S601, a prime word and text corresponding to the generating-word instructing vector $w'_j$ are extracted from the dictionary. In step S602, unnecessary symbols, e.g., "n" or "vi" indicative of a part of speech, a comma, a semicolon or the like indicative of pause, are deleted from character strings extracted in step S601. In step S603, capital letters are changed to small letters. In step S604, combined words are decomposed. For instance, "hardworking" is decomposed to "hard" and "working". In step S605, unnecessary words are deleted. In FIG. 6, "of" is deleted. In step S606, conjugation of the words is changed to an original form. In FIG. 6, "working" is changed to "work".

Figure 8:
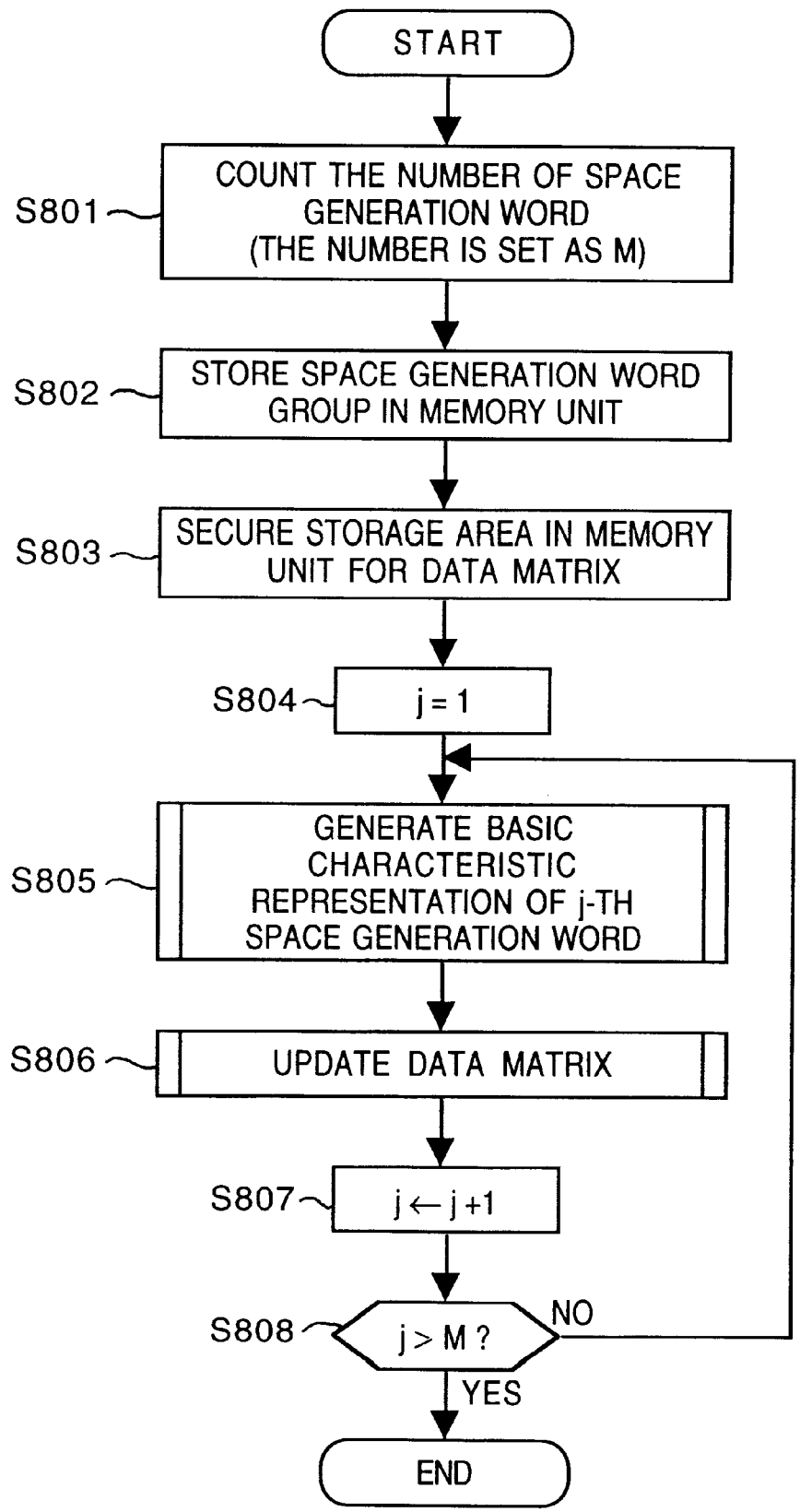
FIG. 8 is a flowchart showing the steps of processing data matrix generation.

In the foregoing manner, the prime word, i.e. generating-word instructing vector $w'_j$, is described by the combination of the basic characteristic words. Based on this description, in step S607, if the n-th basic word is included in the text described by the combination of the basic characteristic words corresponding to the prime word $w'_j$, the n-th element $w''_{j,n}$ of the basic characteristic representation $w''_j$ is set at 1. Hereinafter, the foregoing steps will be referred to as data matrix generation steps. Processing for generating an even more accurate data matrix will be shown in FIGS. 8 and 9.

In step S801, the number of space generation words is counted and the number is set as M. In step S802, the space generation word group is stored in the memory unit 105. If the order of the space generation words is used as an index, the data stored in the memory unit can be regarded as the LUT. In step S803, a storage area for data matrix is allocated in the memory unit 105. In step S804, j is set to 1. In step S805, the basic characteristic representation of the j-th space generation word is generated in the steps shown in FIG. 6. In step S806, the j-th basic characteristic representation is added as the j-th row of the current data matrix (matrix having j−1 rows and N columns), and the new data matrix (matrix having j rows and N columns) is obtained. In step S807, j←j+1 is executed. In step S808, it is determined if j>M is satisfied, and if so, the processing ends; otherwise the processing returns to step S805.

Upon generating the data matrix in step S402 in the above-described manner, in step S403, the data matrix A is normalized by two norms with respect to each row in such manner that the autocorrelation of the basic characteristic has the largest value.

$$a_{m,n} = \frac{a_{m,n}}{\sum_{k=1}^{M} (a_{k,n})^2} \tag{3}$$

Herein, $a_{m,n}$ is an element located in the m-th row and n-th column of the data matrix A. The data matrix is stored in the memory unit 105.

In step S404, correlation matrix $A^T A$ is generated from the data matrix A. Then the correlation matrix $A^T A$ is subjected to eigenvalue decomposition. For instance, by performing singular-value decomposition on the correlation matrix $A^T A$, an eigenvalue and an eigenvector of $A^T A$ are obtained.

$$A^T A = Q \text{diag}(\lambda) Q^T \tag{4}$$

Herein, diag( ) is a diagonal matrix having vector x as a diagonal element. The vector $\lambda$ and matrix Q are obtained by the following equation, utilizing eigenvalues $\lambda_1, \lambda_2, \ldots, \lambda_N$ and corresponding eigenvectors $q_1, q_2, \ldots, q_N$:

$$\lambda = (\lambda_1 \lambda_2 \ldots \lambda_N)^T \tag{5}$$

$$Q = (q_1, q_2, \ldots, q_N) \tag{6}$$

Since the correlation matrix is a symmetric matrix, the eigenvalues $\lambda_1, \lambda_2, \ldots, \lambda_N$ are all real numbers and the corresponding eigenvectors $q_1, q_2, \ldots, q_N$ are orthogonal to each other.

In step S405, while defining a semantic space as a linear space formed by each of the eigenvectors corresponding to non-zero eigenvalues (the number of which=v ($\leq$N)), an eigenvector corresponding to eigenvalue 0 is deleted from the matrix Q to generate a new matrix Q, which is called a semantic space transformation matrix Q:

$$Q = (q_1, q_2, \ldots, q_v) \quad (7)$$

The semantic space transformation matrix Q is stored in the memory unit 105. Meanwhile, a representation $<f>_j$ in the semantic space of the j-th basic characteristic, constructing the basic characteristic group, is obtained by the following equation, utilizing vector F(j) where the j-th element is 1 and all the other elements are 0:

$$<f>_j = Q^T F(j) \quad (8)$$

In step S406, the representation $<f>_j$ (j=1, 2, ..., N) of all the basic characteristics in the semantic space is stored in the memory unit 105. The semantic space generated as described above is necessary, only one for one application. Thus, the above-described processing may be performed off-line. Alternatively, data which has been determined as described above by other apparatuses may be received via a communication line or a memory medium, and stored.

Figure 10:
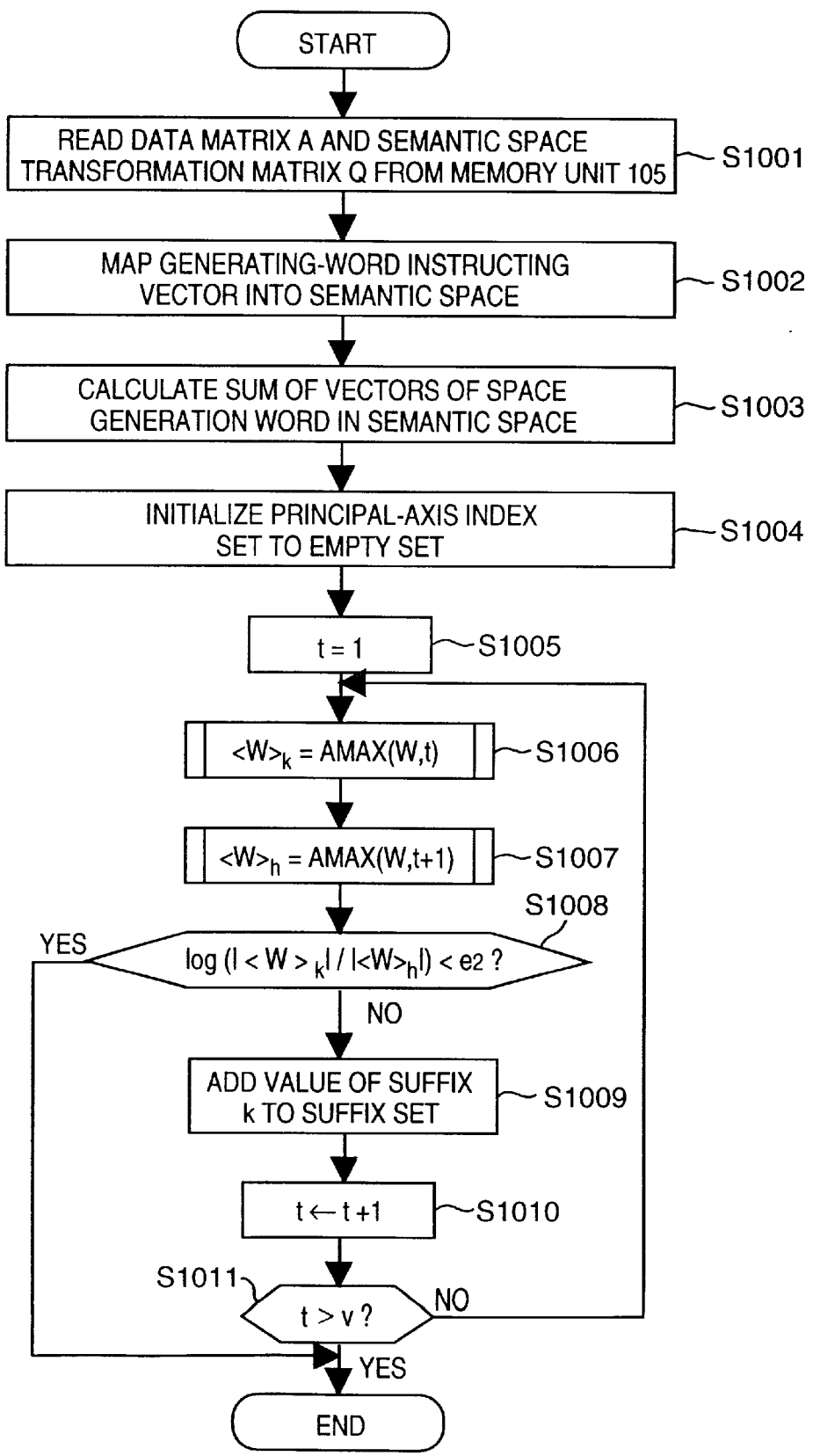
FIG. 10 is a flowchart showing composite processing of a principal-axis index set.

In step S407, the semantic space generating module 106 calculates a principal-axis index set by executing the processing which will be described below with reference to the flowchart in FIG. 10, and stores it in the memory unit 105.

In step S1001, the data matrix A and semantic space transformation matrix Q are read out of the memory unit 105. In step S1002, the generating-word instructing vector $w'_j$ is transformed to a descriptor $<w>_j$ in the semantic space.

$$<w>_j = (AQ)^T w'_j \quad (9)$$

In step S1003, the sum of the representation $<w>_j$ (j=1, 2, ..., M) of a space generation word in the semantic space is obtained by the following equation:

$$\langle W \rangle = \sum_{j=1}^{M} \langle w \rangle_j$$

Herein, a function for obtaining a suffix of an element having the t-th largest absolute value in the elements of the vector <W>, is defined as AMAX(<W>, t).

Figure 11:
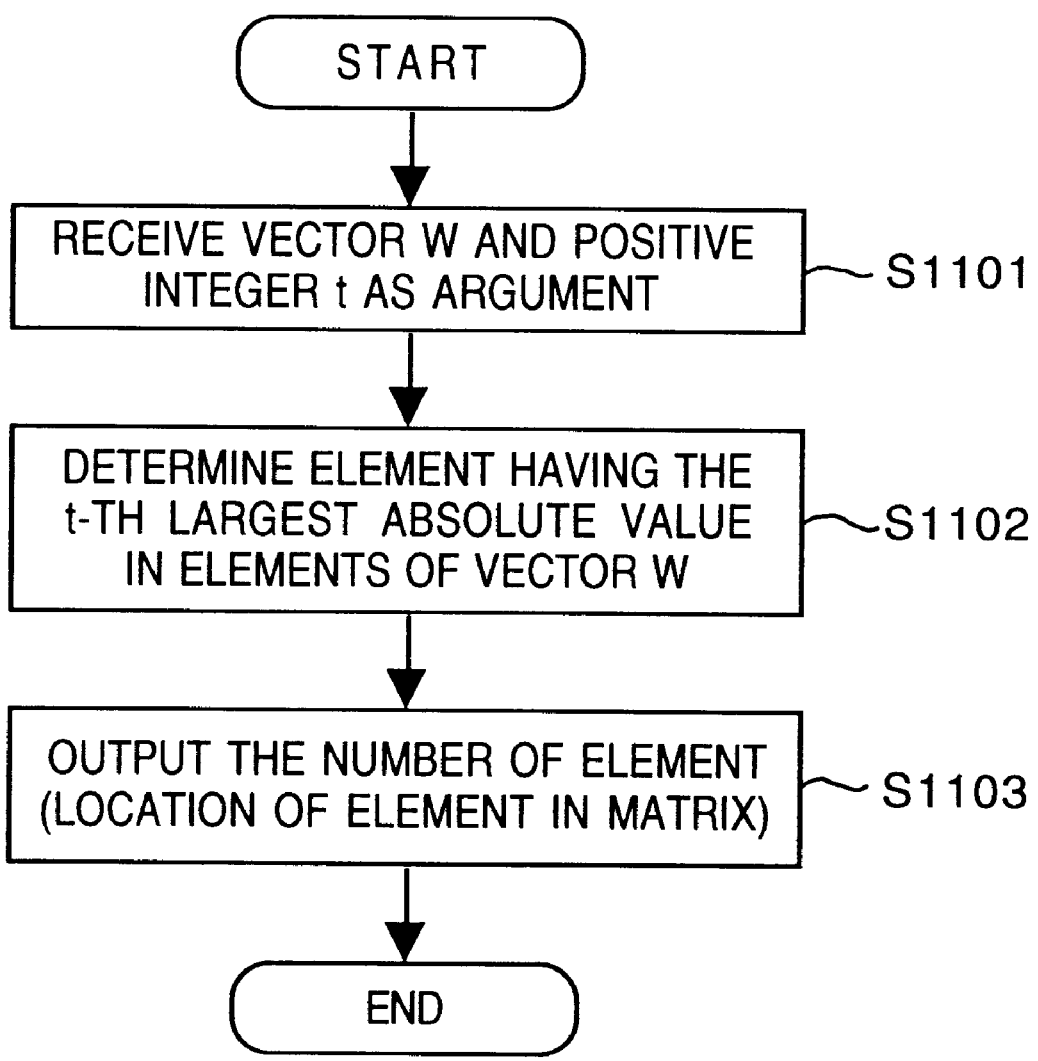
FIG. 11 is a flowchart showing processing steps of a function AMAX.

FIG. 11 shows the processing steps of the function AMAX. In step S1101, the vector W and a positive integer t are received as an argument. In step S1102, an element, having the t-th largest absolute value in the elements of the vector W. is determined, and the number of the determined element (location of the element in the matrix) is outputted.

At this stage, a suffix set $\Lambda(e_2)$ for a predetermined integer $e_2$ is obtained in the following manner.

In step S1004, the suffix set $\Lambda(e_2)$ is initialized to an empty set. In step S1005, t to 1 is set. In step S1006 to S1007, a value of a suffix variable k is set as AMAX(<W>, t); and a value of a suffix variable h, as AMAX(<W>, t+1). In step S1008, if $\log(|<W>_k|/|<W>_h|)<e_2$ is satisfied, the processing ends. In step S1009, the value of the suffix variable k is added to the suffix set $\Lambda(e_2)$. In step S1010, t←t+1 is executed. In step S1011, if t$\leq$v is satisfied, the processing returns to step S1006; otherwise, the processing ends.

The suffix set $\Lambda(e_2)$ obtained in the foregoing manner is defined as the principal-axis index set, and is stored in the memory unit 105.

<Projective Transformation Generating Module 104>

Figure 12:
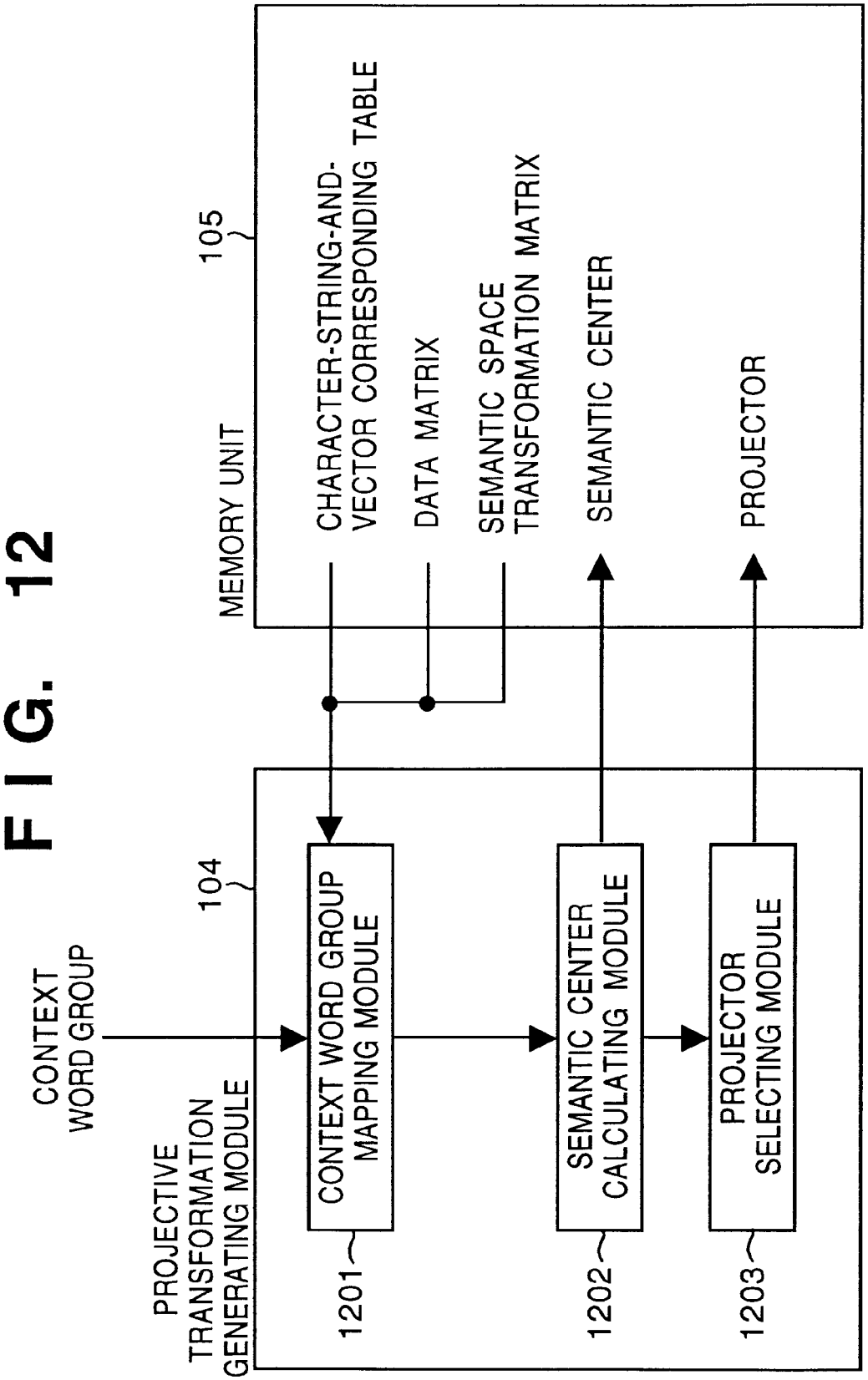
FIG. 12 is a block diagram showing projection processing.

FIG. 12 is an explanatory view for explaining the processing of the projective transformation generating module 104. In the projective transformation generating module 104, the context word group, inputted from the communication apparatus 101, is mapped in the semantic space by a context word group mapping module 1201; then a semantic center is calculated by a semantic center calculating module 1202, and a semantic identification projector is selected by a projector selecting module 1203, to be stored in the memory unit 105.

Figure 13:
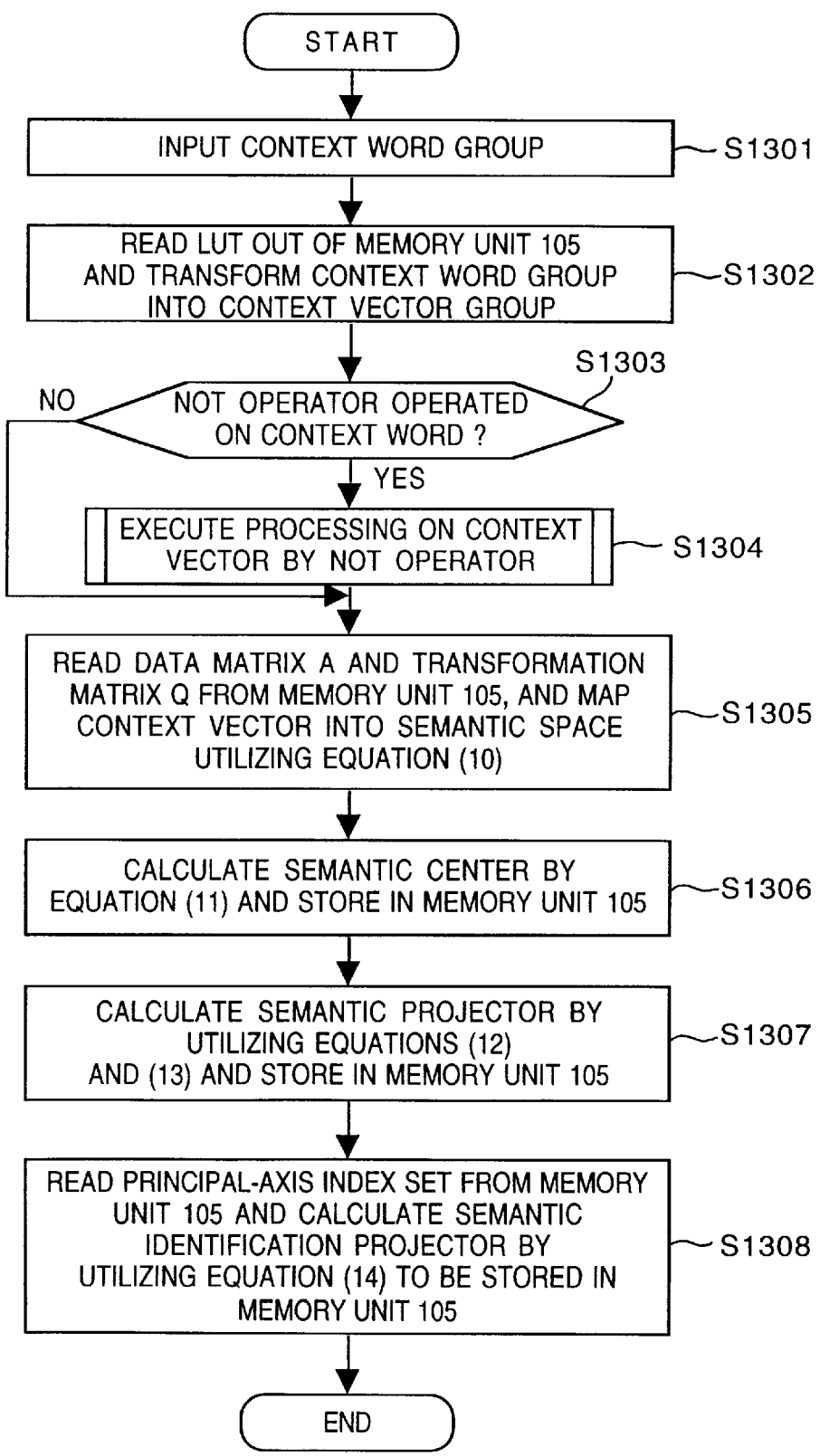
FIG. 13 is a flowchart showing the steps of generating a semantic identification projector.

Hereinafter, the steps of generating the semantic identification projector will be described with reference to the flowchart in FIG. 13.

In step S1301, a context word group $s_k = (\xi_1, u_1, \xi_2, u_2, \ldots, \xi_k u_k)$ is inputted to the input/output apparatus 102. Herein, $u_j$ denotes a context word, and may include a NOT operator as a logical operator. $\xi_j$ denotes a logical operator (e.g. logical AND or logical OR) for $u_j$. In step S1302, the context word $u_k$ (k=1, 2, ..., k) is transformed into the context vector $u'_k$ (k=1, 2, ..., k) utilizing the LUT.

Figure 14:
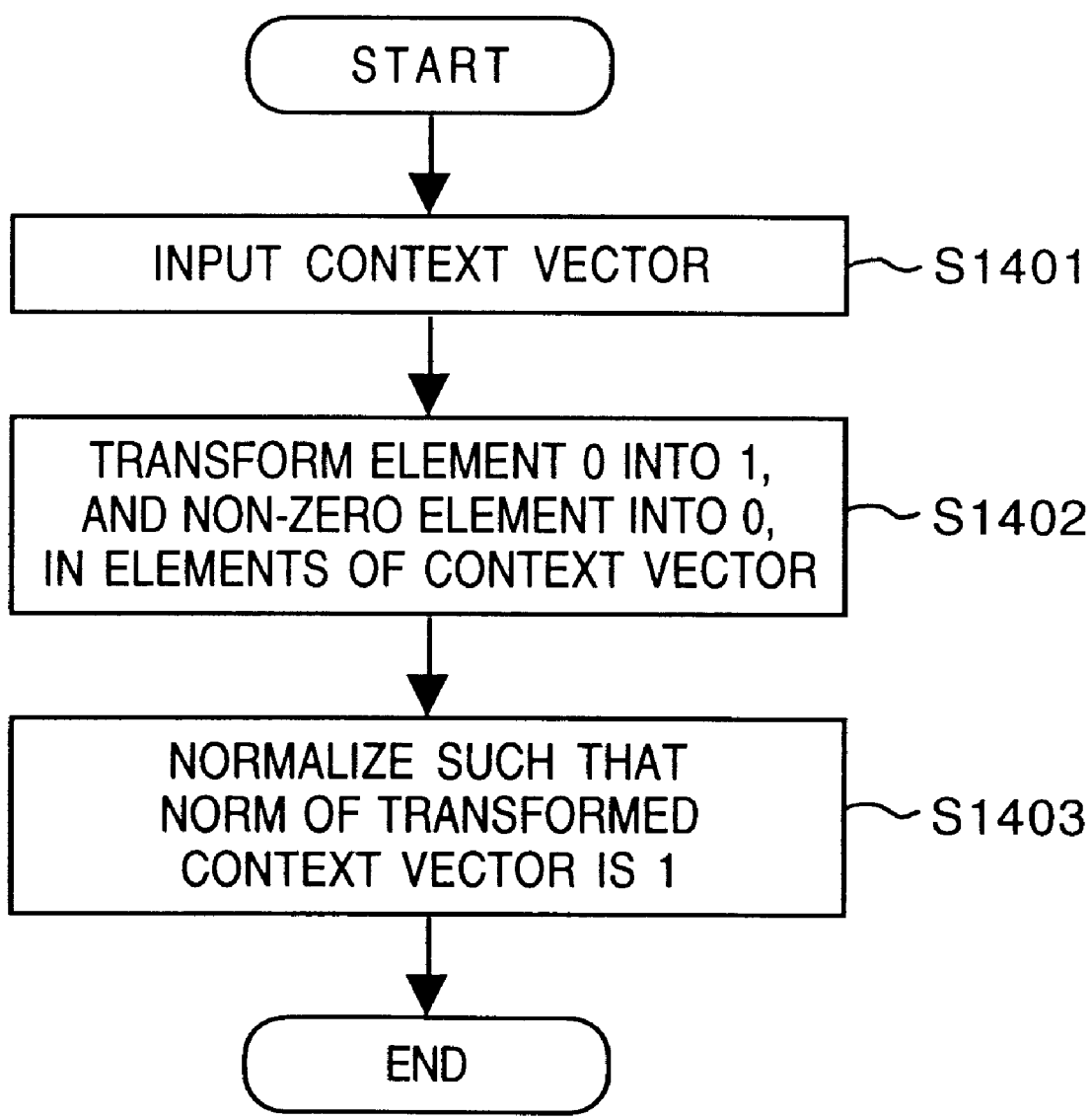
FIG. 14 is a flowchart showing the processing of a NOT operator upon a context vector.

In step S1303, it is determined whether or not a NOT operator is operated upon the context word. If the context word $u_j$ includes a NOT operator, that is, if $u_j$ is designated as a negative of the context word $v_j$, processing is executed by the NOT operator in step S1304. For instance, as shown in FIG. 14, in step S1402, $u_v$ is transformed such that it is orthogonal to $v_j$, and in step S1403, the transformed vector is normalized so that the norm is 1.

Referring back to FIG. 13, in step S1305, the context word vector group $s'_k = (u'_1, u'_2, \ldots, u'_k)$ is transformed into a descriptor $<S>_k = (<u>_1, <u>_2, \ldots, <u>_k)$ in the semantic space, by the data matrix A and semantic space transformation matrix Q.

$$U''_j = (AQ)^T U'_j \quad (10)$$

In step S1306, a semantic center $G(S''_k)$ of the context word vector group is calculated by the following equation:

$$G(s''_k) = \frac{(u''_1)\eta_2(u''_2)\ldots\eta_k(u''_k)}{\|(u''_1)\eta_2(u''_2)\ldots\eta_k(u''_k)\|_\infty} \quad (11)$$

where $\|\cdot\|\infty$ is an infinite norm, and $\eta_j(\ )$ represents the processing corresponding to $\xi_j$. For instance, when $\eta_j(\ )$ is a logical AND, the resultant vector of $(<u>_1)\ \eta_2\ (<u>_2) \ldots \eta_{j-1}(<u>_{j-1})$ is multiplied by $<u>_j$ for each element. When $\eta_1(\ )$ is a logical OR, the resultant vector of $(<u>_1)\ \eta_2\ (<u>_2) \ldots \eta_{j-1}(<u>_{j-1})$ is added to $<u>_j$ for each element.

A value of the j-th element of the semantic center $G(<s>_k)$ calculated in the foregoing manner is defined as $g_j$. Returning to step S1306, the semantic center $G(<s>_k)$ is stored in the memory unit 105. In step S1307, an operator for projecting all the semantic space into the j-th axis (eigenvector $q_j$) of the semantic space is defined as an operator $P_j$.

A predetermined integer $e_1$ is compared with each element $G(<s>_k)_j$, j=1, 2, ..., v of the semantic center $(G(<s>_k)$, and a set of j defined by the following equation is set as $\Lambda(e1)$.

$$|(G(<s>_k)_j| > e_1 \quad (12)$$

where $|\cdot|$ denotes an absolute value.

The semantic projector $Pe_1(<s>_k)$ is defined by the following equation:

$$Pe_1(\langle s \rangle_k) = \sum_{j \in \Lambda(e_1)} P_j \qquad (13)$$

In step S1308, the semantic identification projector $De_2$ ($\langle s \rangle_k$) is calculated by the following equation, utilizing the principal-axis index set $\Lambda(e_2)$ stored in the memory unit 105, and the calculated semantic identification projector is stored in the memory unit 105.

$$De_2(\langle s \rangle_k) = \sum_{j \in \Lambda(e_1)/\Lambda(e_2)} \qquad (14)$$

where $\Lambda(e_1)/\Lambda(e_2)$ denotes all the elements in the set $\Lambda(e_1)$ which are not included in $\Lambda(e_2)$. An operation by the semantic identification projector $De_2(\langle s \rangle_k)$ will be described below.

1) It is assumed that a vector d has 1 for an element corresponding to axes forming the subspace into which a vector is to be projected, and has 0 for other elements. The semantic identification projector $De_2(\langle s \rangle_k)$ is given as a matrix having the vector d as the diagonal element. For instance, in a case where a subspace is formed by the first axis and the third axis of the semantic space in the v-dimensional semantic space, the vector d is obtained by the following:

$$d=(101 \ldots 0) \qquad (15)$$

The semantic identification projector having the foregoing vector d as a diagonal element is obtained by the following:

$$De_2(\langle s \rangle_k) = \begin{pmatrix} 1 & 0 & 0 & \ldots & 0 \\ 0 & 0 & 0 & \ldots & 0 \\ 0 & 0 & 1 & \ldots & 0 \\ 0 & 0 & 0 & \ldots & 0 \end{pmatrix} \qquad (16)$$

Accordingly, operation of the semantic identification projector to vector w is achieved by the matrix operation.

2) The above-described vector d may be directly utilized. In other words, the vector w subjected to projection may be multiplied by vector d for each element.

3) The semantic identification projector is expressed by an axis number which constitutes the subspace. For instance, if the first and third axes of the semantic space constitute the subspace, 1 and 3 are stored as the semantic identification projectors. For projecting the vector, a function is prepared for changing elements, besides the designated axis number, in the vector to zero upon inputting a vector of interest and the axis numbers constituting the subspace.

The context word group to be inputted to the projective transformation generating module 104 is sequentially given by the communication apparatus 101. Therefore, the above described semantic projector $Pe_1(\langle s \rangle_k)$ and the semantic identification projector $De_2(\langle s \rangle_k)$ are sequentially calculated.

<Comparison-Subjected Word Group Mapping Module 107>

Figure 15:
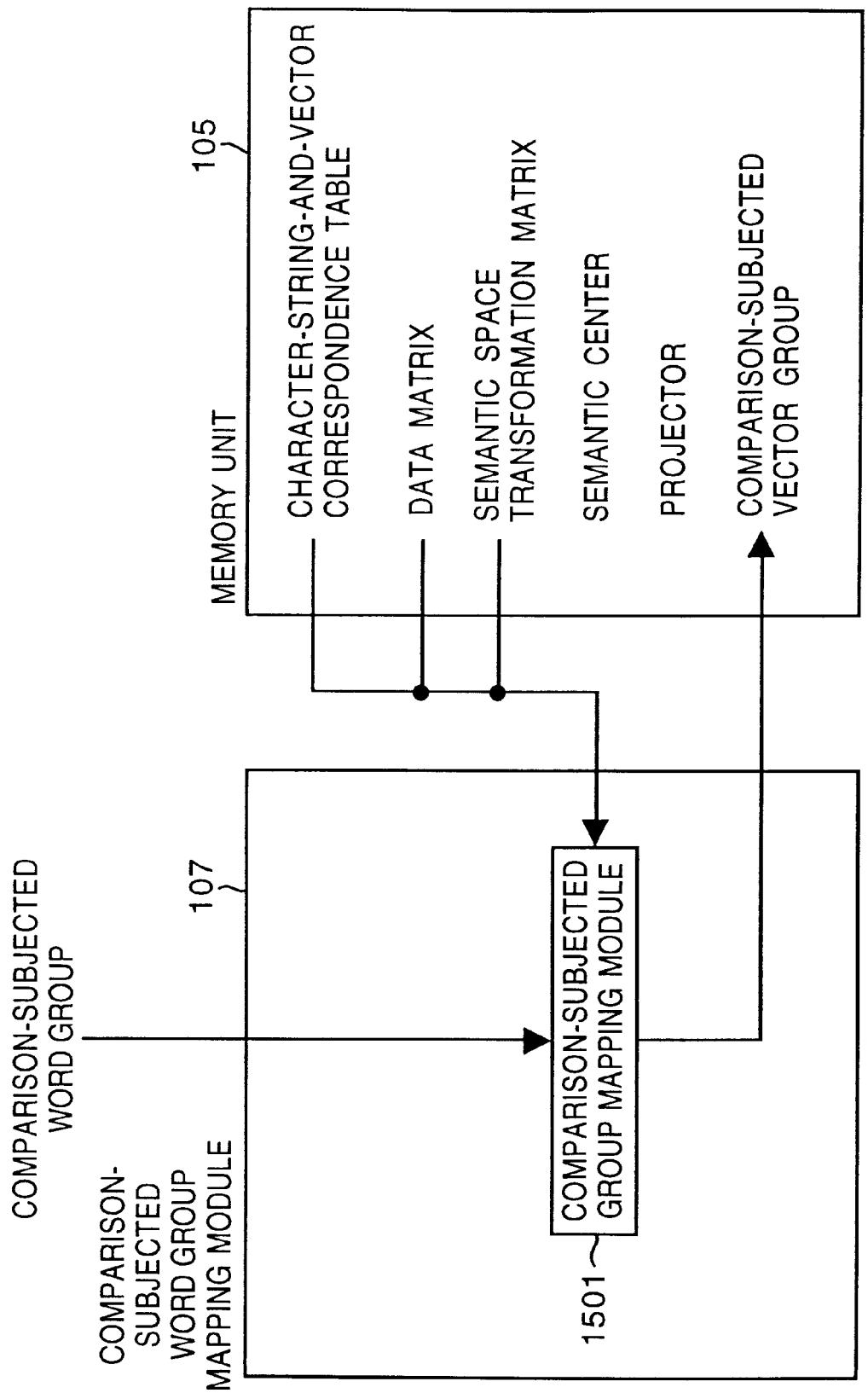
FIG. 15 is a block diagram showing a structure of the comparison-subjected word group mapping module.

FIG. 15 shows a structure of the comparison-subjected word group mapping module 107. When a comparison-subjected word group (a set of L comparison-subjected words) is inputted by the input/output apparatus 102, it is transformed into a comparison-subjected vector group by a comparison-subjected group mapping module 1501, and stored in the memory unit 105. Hereinafter, the processing will be described with reference to the flowchart in FIG. 16.

First in step S1601, a comparison-subjected word $c_j$ is transformed to a comparison-subjected vector $c'_j$ by utilizing the LUT. In step S1602, a descriptor $\langle C \rangle_j$ of the comparison-subjected vector in the semantic space is obtained, by operating the data matrix A and the semantic space transformation matrix Q upon the comparison-subjected vector.

$$\langle C \rangle_j = (AQ)^T C_j \qquad (17)$$

In step S1603, $\langle C \rangle_j$ is projected in the subspace using the semantic identification projector $De_2(s_{\langle s \rangle K})$ stored in the memory unit 105.

$$[c]_j = De_2(S_{\langle s \rangle K}) \langle C \rangle_j \qquad (18)$$

The descriptor $[c]_j$ of the comparison-subjected vector in the subspace is stored in the memory unit 105. The foregoing process is executed on all the L number of comparison-subjected words.

<Basic Processing Module 103>

Figure 17:
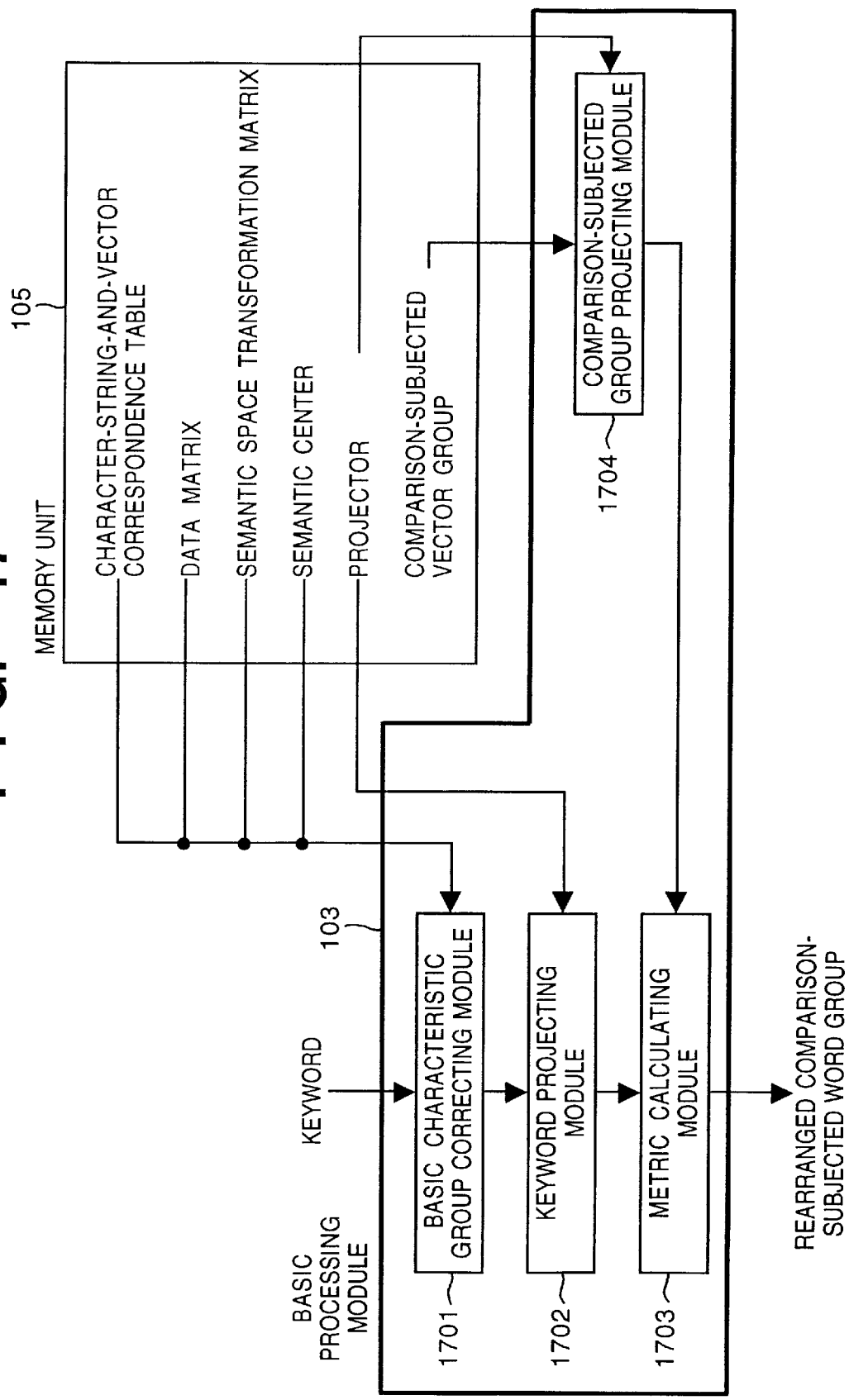
FIG. 17 is a block diagram showing the structure of a basic processing module.

FIG. 17 shows a structure of the basic processing module 103. The basic characteristic group correcting module 1701 corrects the basic characteristic group of a keyword by utilizing dynamic metrics (distance, norm and the like) determined by the semantic center. The keyword and comparison-subjected word group are projected in a subspace respectively by the keyword projecting module 1702 and the comparison-subjected group projecting module 1704, utilizing the semantic identification projector. The relation between the keyword and the comparison-subjected word group is calculated by the metric calculating module 1703 on the subspace. Hereinafter, the calculation method of the metric is described with reference to the flowchart in FIG. 18.

In step S1801, a keyword r received by the communication apparatus 101 is inputted to the basic processing module 103.

In step S1802, the basic characteristic representation $r''=(r_1 \ r_2 \ \ldots \ r_N)^T$ of the keyword r is calculated, utilizing the LUT and data matrix A.

$$r''=A^T r' \qquad (19)$$

In step S1803, when the k-th element $\langle f \rangle_{j,k}$ of a descriptor $\langle f \rangle_j$, j=1, 2, ..., N has an opposite sign from that of the k-th element $g_k$ of the semantic center G, for instance, the following process is performed. In the case of opposite sign, that is, when the product thereof is negative, $\langle f \rangle_{j,k}$ is reset to 0. By utilizing the basic characteristic corrected in the above-described manner and the descriptor $\langle f_m \rangle_j$ in the semantic space, the following transformation matrix is constructed.

$$R=(\langle f_m \rangle_1 \langle f_m \rangle_2 \ldots \langle f_m \rangle_N) \qquad (20)$$

In step S1804, the keyword vector r' is transformed by utilizing the data matrix A and the aforementioned transformation matrix R.

$$[r_m]=(AR)^T r' \qquad (21)$$

Herein, the above $[r_m]$ will be referred to as a corrected semantic space representation of a keyword.

In step S1805, the distance between $[r_m]$ and a comparison-subjected vector group ($[c]_1, [c]_2, \ldots, [c]_L$) stored in the memory unit 105 is calculated by the following equation:

$$p([r_m], [c]_k) = \sqrt{\sum_{j=1}^{v} (g_j(([r_m]_j)^T - [c]_{k,j}))^2} \quad (22)$$

On the basis of the distance calculated in the foregoing manner, the keyword vector group is rearranged in the order of shortest distance first (in the order closest to the comparison-subjected vector) and stored in the memory unit 105.

In step S1806, the keyword vector is outputted in accordance with an output form designated by a user. At this stage, the keyword vector may be inversely transformed to a character string, by utilizing the semantic space transformation matrix, data matrix and LUT.

Next, error processing in step S207 in FIG. 2 will be described with reference to the flowchart in FIG. 19.

In steps S1901–S1902, whether an error code is 1 or 2 is determined. When the error code is 1, the input/output apparatus 102 is designated in step S1904 as an output apparatus to which an error message is to be outputted. Meanwhile, when the error code is 2, the communication apparatus 101 is designated in step S1903 as an output apparatus to which an error message is to be outputted. In step S1905, the error message is outputted to the designated outputting apparatus.

Second Embodiment

Figure 20:
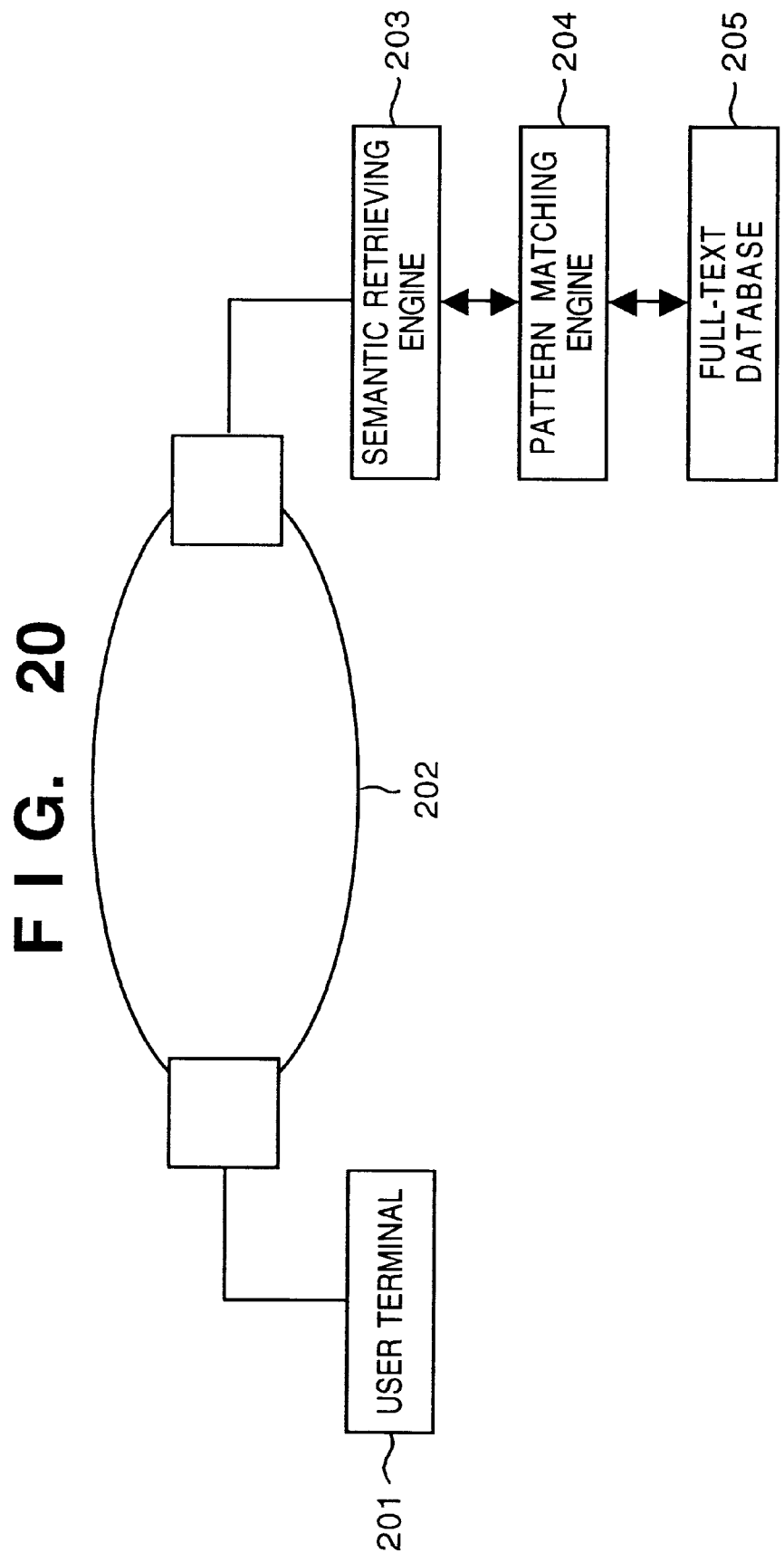
FIG. 20 is a block diagram showing a structure of the second embodiment.

FIG. 20 is a block diagram showing the structure of the second embodiment of the present invention.

The second embodiment provides a system integrating the first embodiment with the conventional pattern-matching-type database. The second embodiment is configured with a user terminal 201, communication line 202, semantic retrieving engine 203, pattern matching engine 204 and full-text database 205. In the second embodiment, the context word group or the keyword group are transmitted to the semantic retrieving engine 203 (detailed will be described later) via the communication line 202.

The most suitable keyword obtained by the semantic retrieving engine 203 is transmitted to the pattern matching engine 204. In the pattern matching engine 204, data (retrieved result) obtained as a result of processing is read out of the full-text database 205 and returns the retrieved result to the semantic retrieving engine 203. The semantic retrieving engine 203 returns the retrieved result to the user terminal 201 via the communication line 202.

Figure 21:
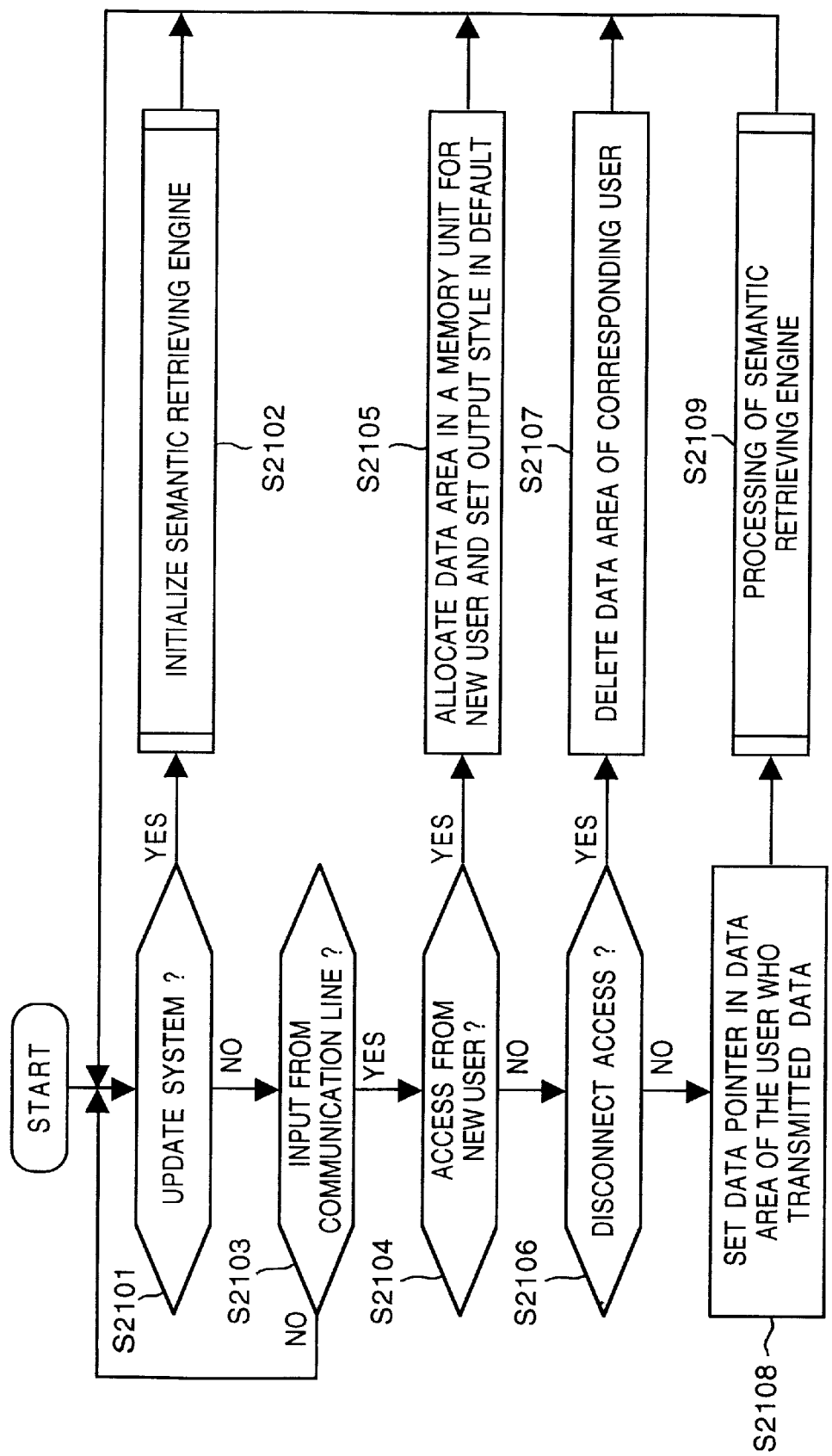
FIG. 21 is a flowchart describing the processing performed by the second embodiment.

FIG. 21 is a flowchart showing the processing performed by the system of the second embodiment.

Figure 22:
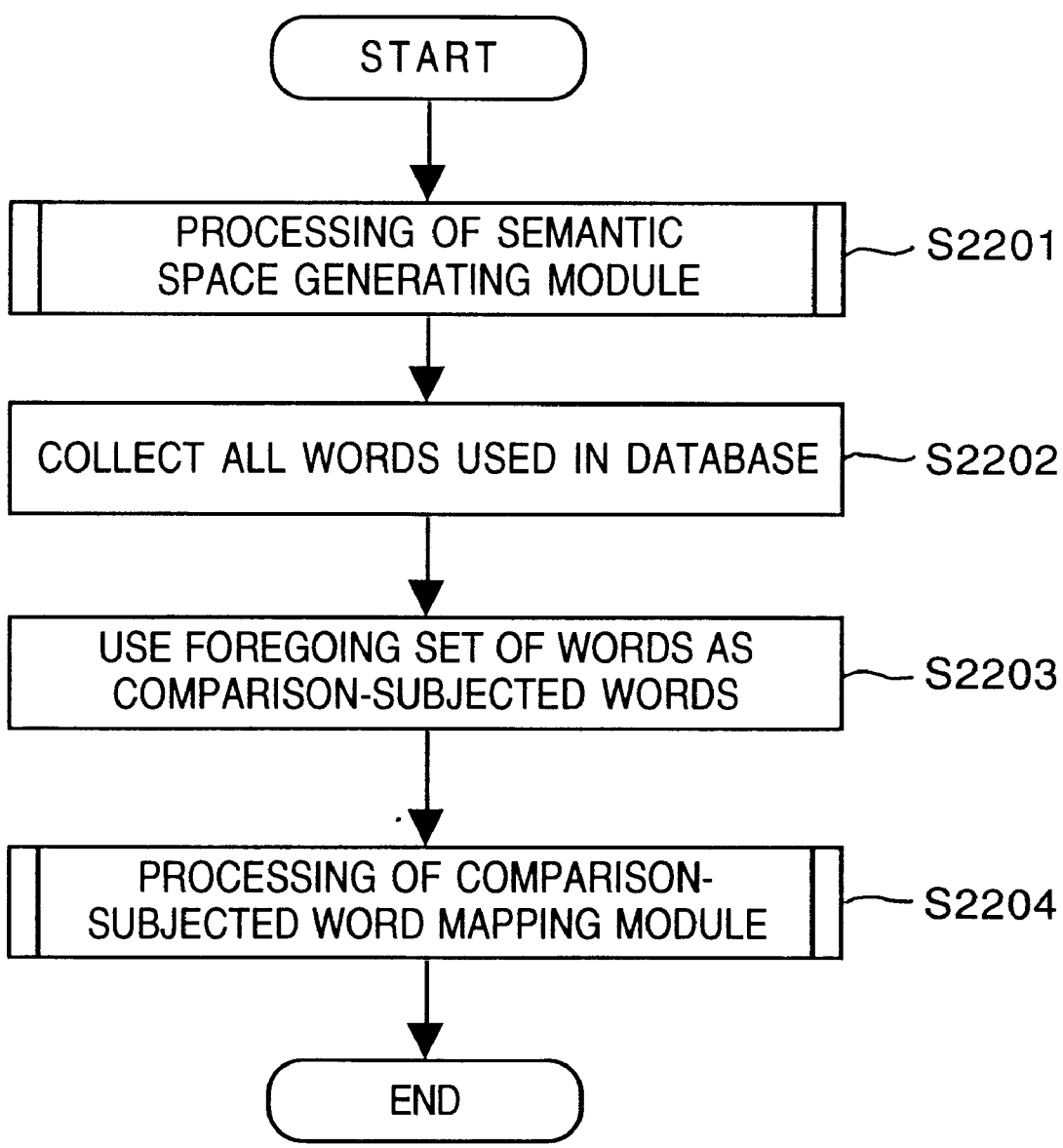
FIG. 22 is a flowchart showing initializing process of a semantic retrieving engine.

First in step S2101, whether system updating is to be performed is determined; and if updating is to be performed, in step S2102, the semantic retrieving engine 203 is initialized in the manner shown in the flowchart in FIG. 22.

In step S2201, semantic space generating process, shown in FIG. 4 with reference to the first embodiment, is performed. In steps S2202–S2203, words (keyword) used in the full-text database 205 are collected to be used as a comparison-subjected word. In step S2204, the comparison-subjected word mapping processing, described in the first embodiment with reference to FIG. 16, is performed.

For the processing other than system updating, the system performs normal processing.

In step S2103, the system awaits for an input via the communication line 202. Upon receiving an input, it is determined in step S2104 whether or not the access is performed by a new user. Herein, the new user means users other than those who are currently performing retrieving operation. If it is determined that the access is performed by a new user, a data area for the new user is allocated in a memory unit of the semantic retrieving engine in step S2105, and the processing returns to step S2101.

If it is determined in step S2104 that the access is not performed by a new user, it is determined in step S2106 whether or not the data is a command for disconnecting the access. If so, the data area for the corresponding user is released in step S2107 and the processing returns to step S2101. If a command other than an access-disconnect command is sent by an existing user, a data pointer is set in step S2108 in the data area of the corresponding user. In step S2109, processing performed by the semantic retrieving engine and processing performed by the pattern matching engine, which will be described later with reference to FIG. 23, are performed, the retrieved result is outputted, and the processing returns to step S2101.

Figure 23:
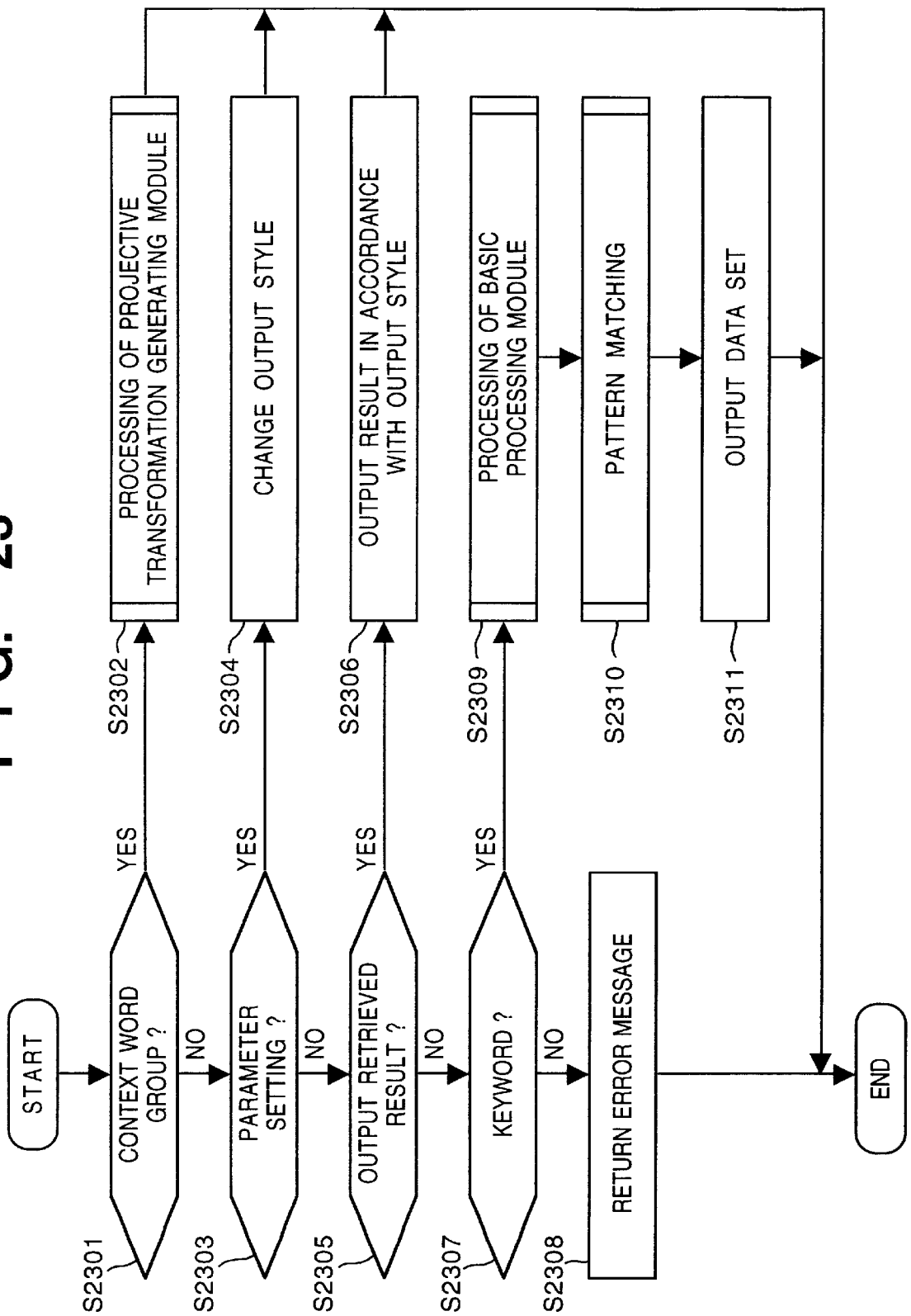
FIG. 23 is a flowchart showing the processing of the semantic retrieving engine.

FIG. 23 is a flowchart showing the processing steps of the semantic retrieving engine.

First in step S2301, it is determined whether or not inputted data is a context word group; if it is, processing performed by the projective transformation generating module 104, described in the first embodiment with reference to FIG. 14, is performed and the processing ends. If it is not, the processing proceeds to the next step. In step S2303, it is determined whether or not the inputted data is a parameter-setting command; if it is, in step S2304, the designated parameters are stored in the data area to change the output form and the processing ends. If it is not, the processing proceeds to the next step. In step S2305, it is determined whether or not the inputted data is a retrieved-result output command; if it is, in step S2306, the retrieved result is outputted in accordance with the output form and the processing ends. If it is not, the processing proceeds to the next step.

In step S2307, it is determined whether or not the inputted data is a keyword; and if it is not, error processing is executed and the processing ends. If the inputted data is a keyword, the processing proceeds to the next step. In step S2309, the processing by the basic processing module, described in the first embodiment with reference to FIG. 18, is performed to obtain a comparison-subjected word (most suitable keyword) which is closest to the keyword inputted by the user. In step S2310, the keyword is transmitted to the pattern matching engine, and the processing of the pattern matching engine which will be described later is performed. In step S2311, a data set transmitted by the pattern matching engine 204 is stored in the memory unit 105, and the processing ends.

Figure 24:
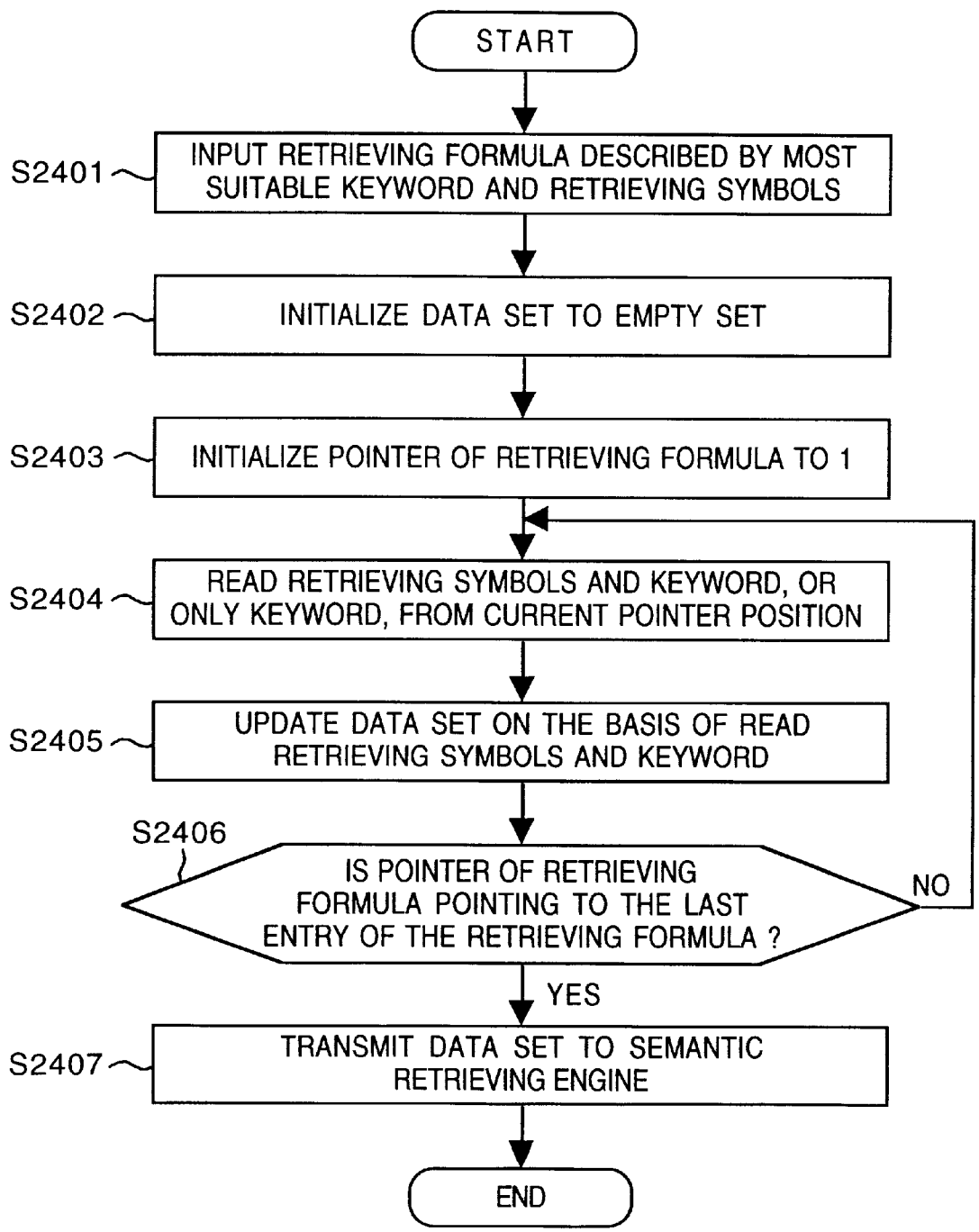
FIG. 24 is a flowchart showing the processing of a pattern matching engine.

The processing performed by the pattern matching engine 204 will be described with reference to FIG. 24.

In step S2401, a retrieving formula described by the most suitable keyword and retrieving symbols is inputted from the semantic retrieving engine 203. In step S2402, the retrieved result of the data set is initialized to an empty set, and in step S2403, the pointer of the retrieving formula is initialized to 1. In step S2404, the retrieving symbols and keyword, or just a keyword, are read from the current position of the pointer, and the pointer is set at the next position of the read retrieving symbols and keyword. In step S2405, retrieving operation is performed by pattern matching based on the read retrieving symbols and keyword, and the data set is updated.

In step S2406, it is determined whether or not the pointer of the retrieving formula points to the last entry of the formula; and if that is the case, in step S2407, the data set is returned to the semantic retrieving engine and the processing ends. If that is not the case, the processing returns to step S2404.

Note that the data set referred herein may be the sequential numbers assigned to the data stored in the full-text database 205, or may be the data itself.

Third Embodiment

Figure 25:
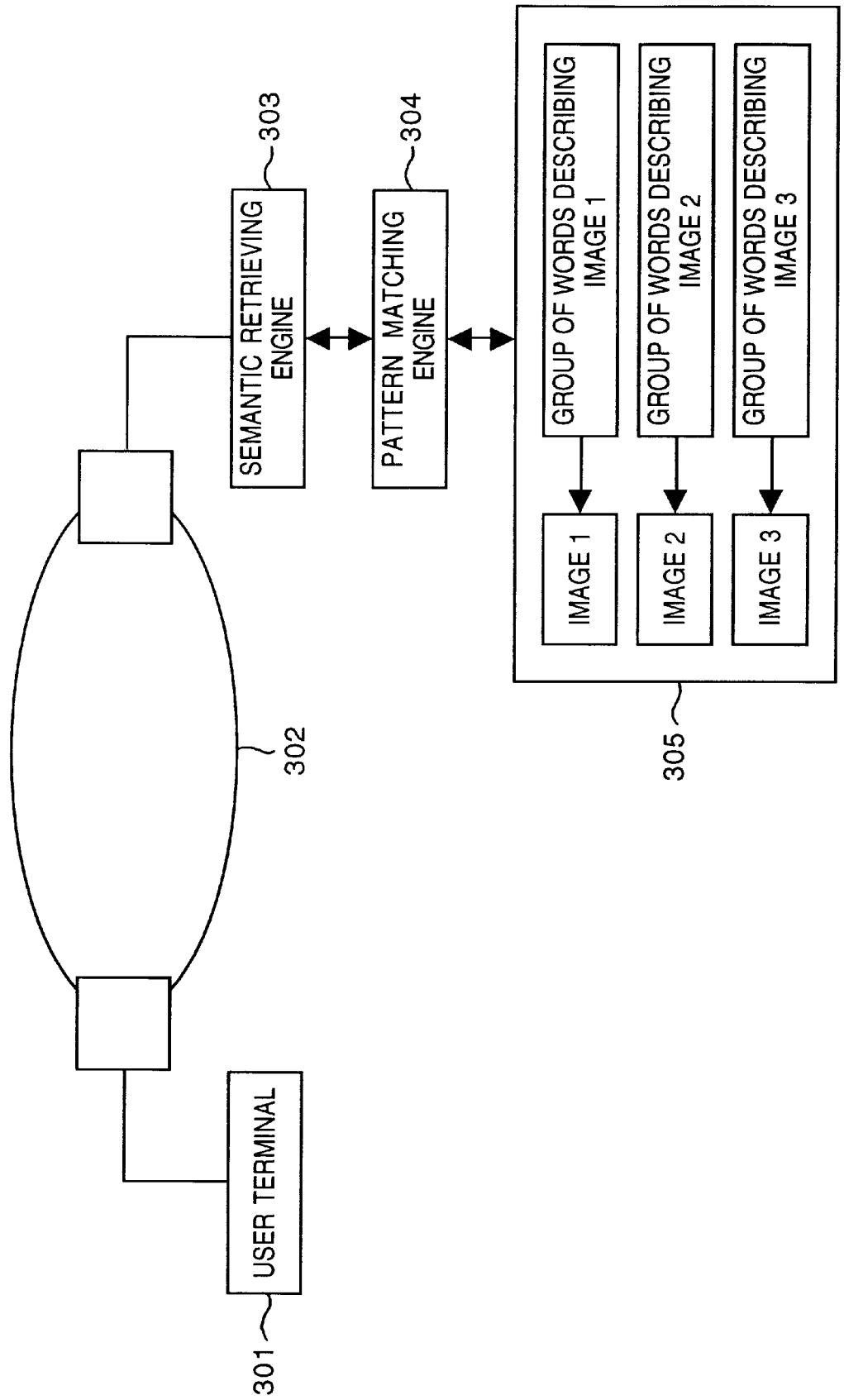
FIG. 25 is a block diagram showing a structure of the third embodiment.
Figure 26:
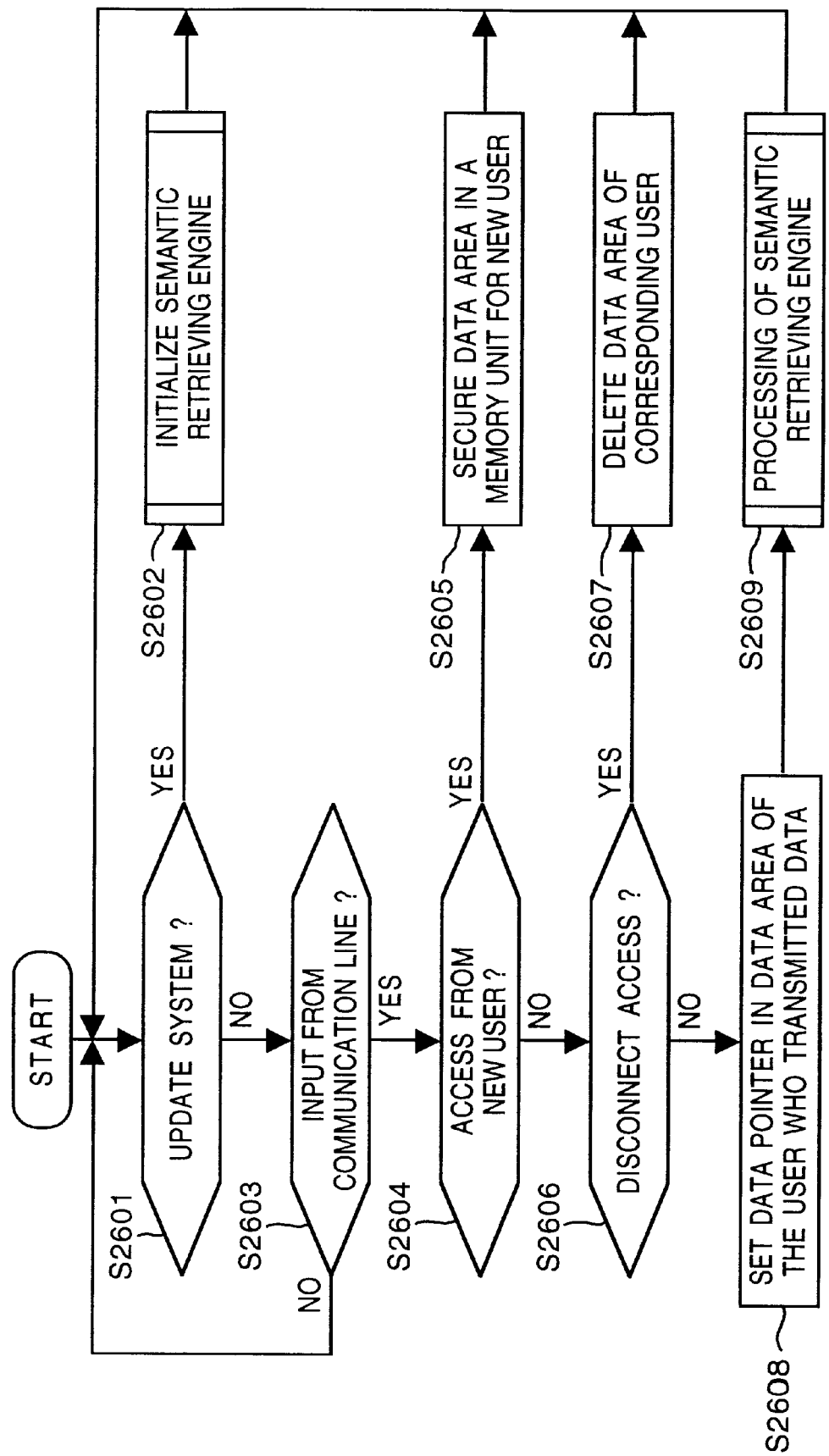
FIG. 26 is a flowchart describing the processing performed by the third embodiment.

FIG. 25 shows the system construction of the third embodiment, and FIG. 26 is a flowchart of the processing performed by the system. The third embodiment is an application example of the first embodiment to an image database retrieving system.

The system according to the third embodiment is constructed by, as shown in FIG. 25, a user terminal 301, a communication line 302, a semantic retrieving engine 303, a pattern matching engine 304 and an image database 305.

The processing of the present system will be described with reference to FIG. 26.

First in step S2601, whether or not system updating is to be performed is determined; and only in the case where system updating is performed, the semantic retrieving engine 303 is initialized in step S2602.

Figure 27:
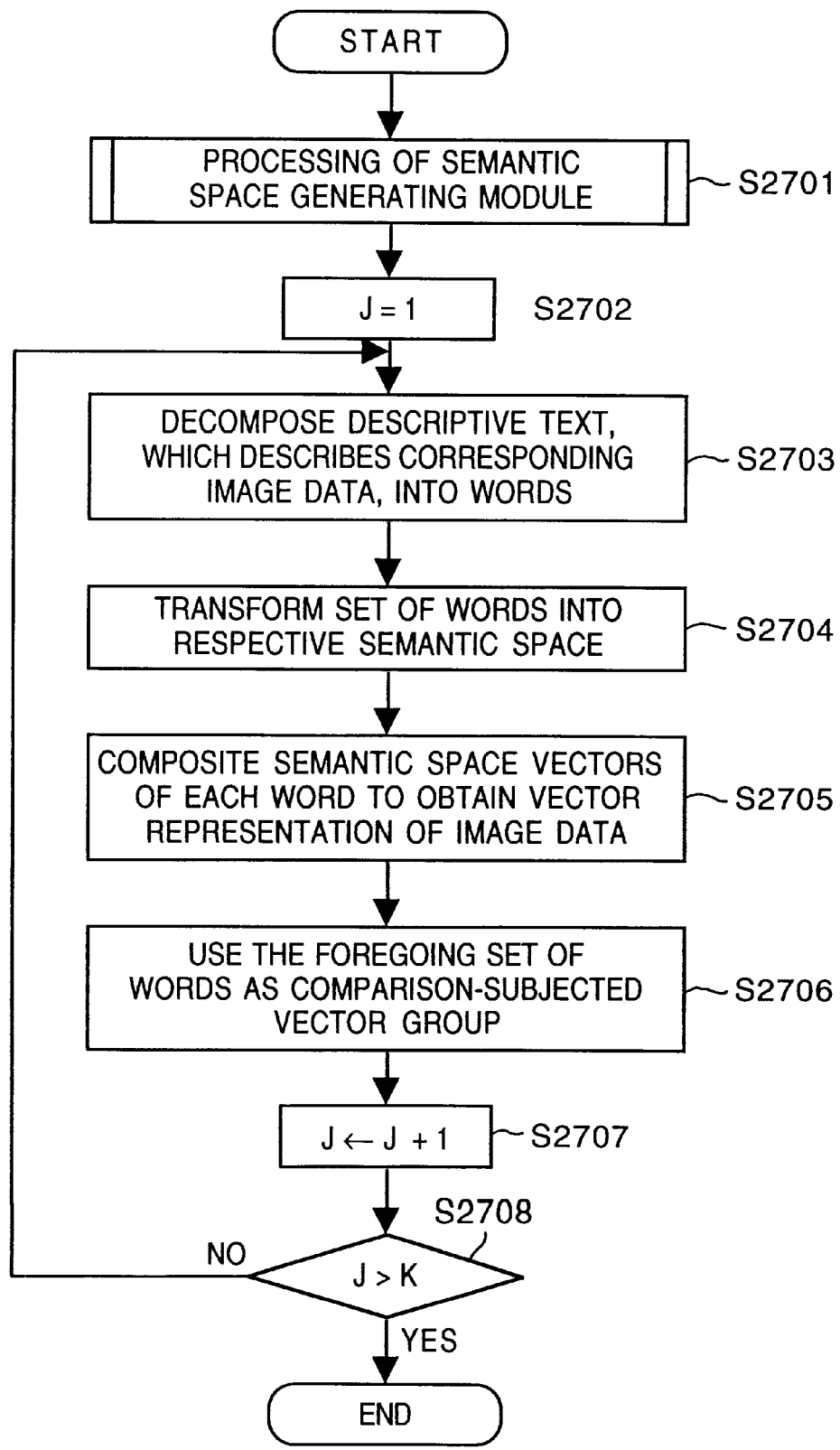
FIG. 27 is a flowchart showing initializing process of the semantic retrieving engine.

The initializing process of the semantic retrieving engine 303 will be described with reference to FIG. 27.

In step S2701, the processing of the semantic space generating module 106 which was described in the first embodiment with reference to FIG. 4 is performed, the LUT, data matrix, semantic space transformation matrix and principal-axis index set are calculated and stored in the memory unit 105. In step S2702, initializing is performed by setting j to 1. In step S2703, a group of words (K number of words) $\{w^j_k\}$ which describes image data stored in the j-th image database 305 is read out. In step S2704, the word group $\{w^j_k\}$ is transformed into a basic characteristic representation $\{W''^j_k\}$ utilizing the LUT and data matrix. Note that $$w''^j_k = (w''^j_{k,1}\ w''^j_{k,2}\ \ldots\ w''^j_{k,N})^T.$$

In step S2705, $\{w'''^j_k\}$ is composed by the following equation.

$$w'''^j_j = (w''^j_{ABMAX(1),1}\ w''^j_{ABMAX(2),2}\ \ldots\ w''^j_{ABMAX(N),N})^T \quad (23)$$

where ABMAX(1) represents the value k having maximum absolute value in $w''^j_{k,1}$ (k=1, ..., K). $W'''^j_j$ will be referred to as vector representation of the j-th image data.

In step S2706, vector representation of the image data is stored as a comparison-subjected vector. In step S2707, j←j+1 is executed. In step S2708, if j>K is satisfied, the processing ends; otherwise the processing returns to step S2702.

Referring back to FIG. 26, for the processing other than system updating, the following processing is performed (See FIG. 26).

In step S2603, the system awaits for an input via the communication line 302. Upon receiving an input, it is determined in step S2604 whether or not the access is performed by a new user. Herein, the new user means users other than those who are currently performing retrieving operation. If it is determined that the access is performed by a new user, a data area for the new user is allocated in a memory unit in the semantic retrieving engine, and the processing returns to step S2601. If it is determined in step S2604 that the access is not performed by a new user, it is determined whether or not the data is a command for access-disconnecting. If so, the data area for the corresponding user is released in step S2607 and the processing returns to step S2601.

Figure 28:
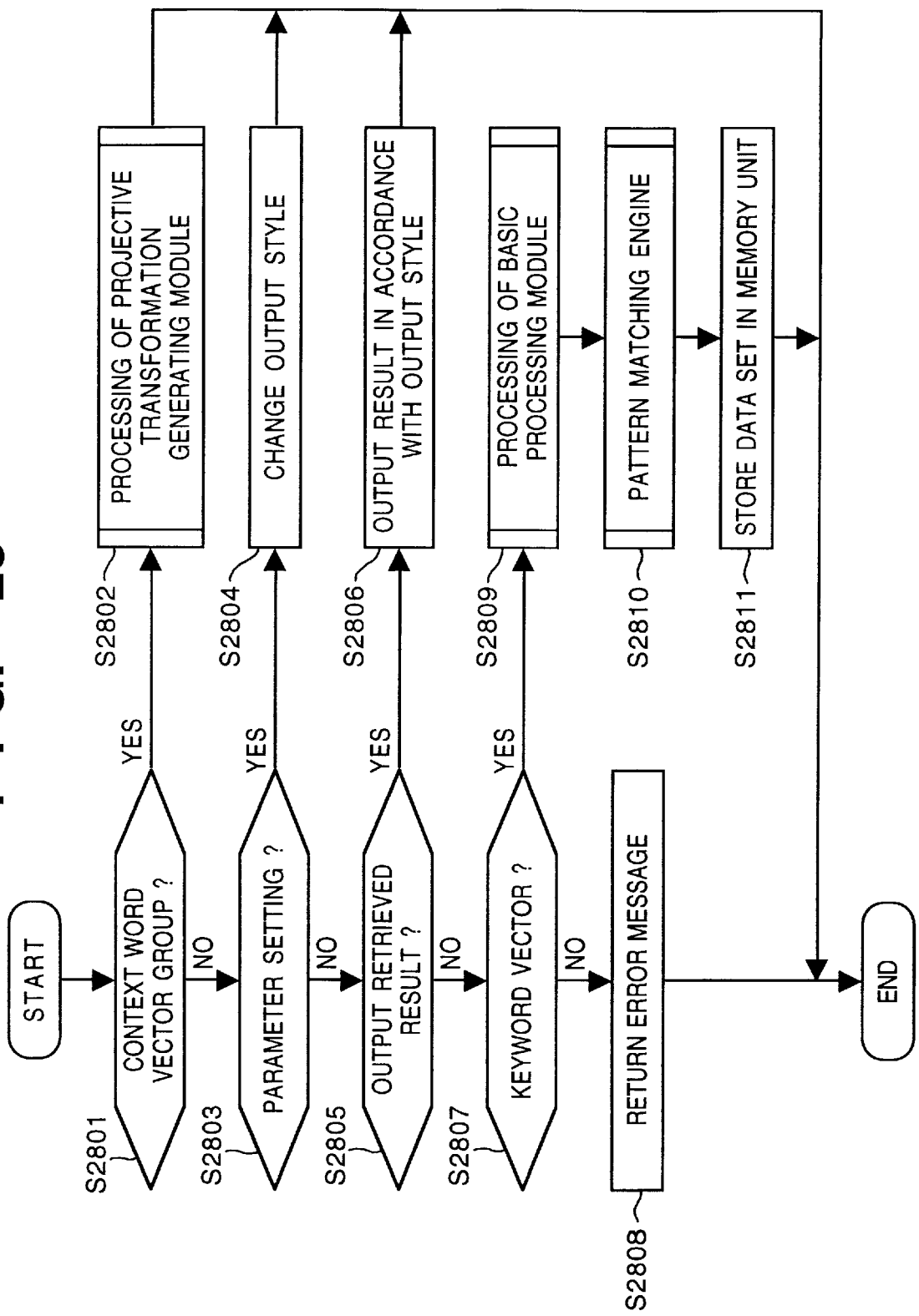
FIG. 28 is a flowchart showing the processing of the semantic retrieving engine.

If a command other than an access-disconnect command is sent by an existing user, a data pointer is set in the data area of the corresponding user in step S2608; then processing of the semantic retrieving engine and processing of the pattern matching engine are performed; and upon outputting the retrieved result, the processing returns to step S2601. The semantic retrieving engine 303 performs the following processing. FIG. 28 shows the flowchart thereof.

Figure 29:
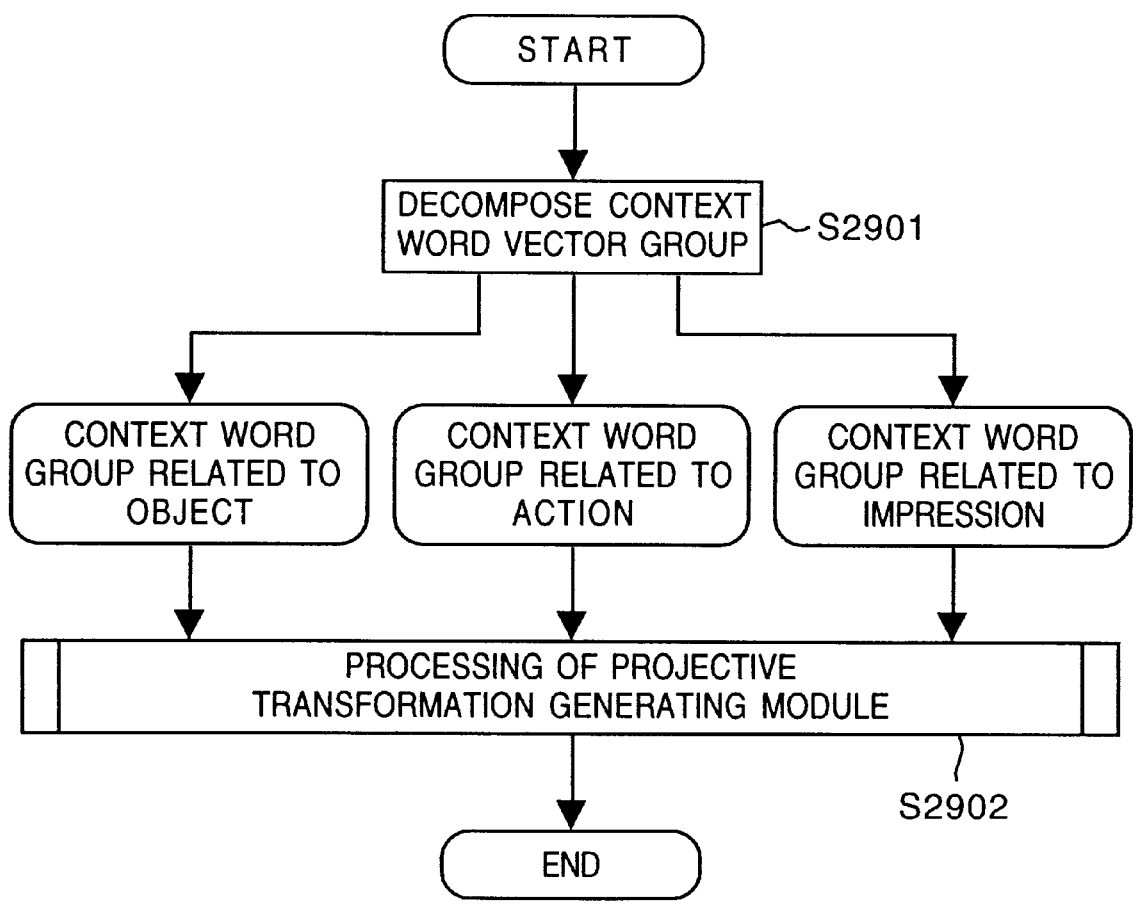
FIG. 29 is a flowchart showing processing of a projective transformation generating module.

In step S2801, whether or not the input data is a context word vector group is determined. If so, the processing of the projective transformation generating module 104 shown in FIG. 29 is performed in step S2802, and the processing ends; otherwise, the processing proceeds to the next step. Herein, the context word vector is a set of context words related to plural attributes, and the context word vector group is a set of the context word vectors. Attributes of a context word depend upon a database. For instance, as attribute of descriptive keywords for image data, a name of an object included in the image, action of the object included in the image, or impression of the image or the like is used.

Figure 30:
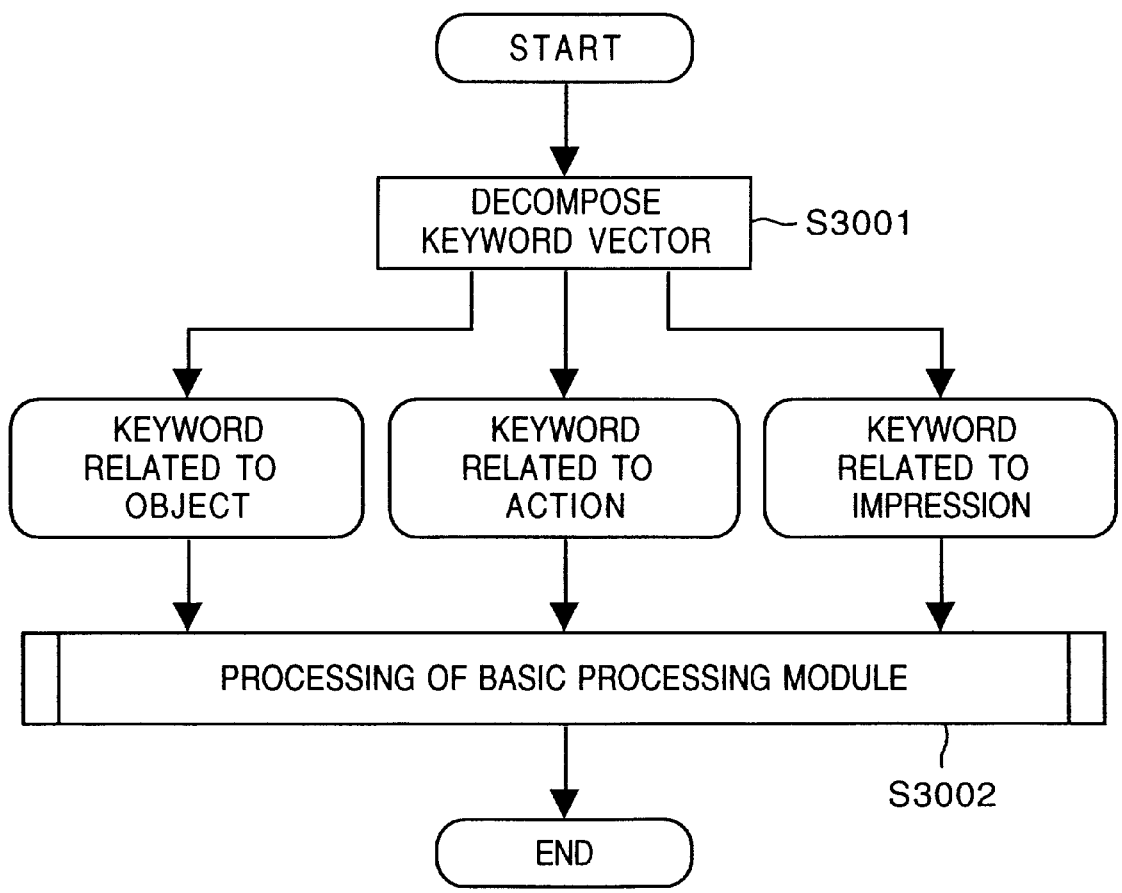
FIG. 30 is a flowchart showing the processing of the basic processing module.

In step S2803, whether or not the input data is a parameter setting command is determined. If it is, the designated parameter is stored in the data area in step S2804 and the processing ends; otherwise, the processing proceeds to the next step. In step S2805, whether or not the input data is a retrieved-result output command is determined. If it is, the retrieved result is outputted in accordance with an output form in step S2806 and the processing ends; otherwise, the processing proceeds to the next step. In step S2807, whether or not the inputted data is a keyword vector is determined. If it is not, error processing is performed in step S2808 and the processing ends. If the inputted data is a keyword vector, the processing proceeds to the next step. Herein, the keyword vector is the similar vector as the above-described context vector. In step S2809, processing of the basic processing module which will be described later with reference to FIG. 30 is performed, and a keyword vector, which is closest to the keyword inputted by a user, is obtained.

In step S2810, the keyword is transmitted to the pattern matching engine 304 to perform processing of the pattern matching engine 304. In step S2811, the data set transmitted by the pattern matching engine 304 is stored in the memory unit and the processing ends. The most suitable keyword vector group, outputted as a result of the processing of the basic processing module, is transmitted to the pattern matching engine 304.

The processing of the projective transformation generating module is described below (FIG. 29).

In step S2901, the context word vector group is decomposed to context word groups of each attribute. In step S2902, the processing of the projective transformation generating module, which was described in the first embodiment with reference to FIG. 14, is performed with respect to each of the context word groups.

Furthermore, the processing of the basic processing module is described below (FIG. 30).

In step S3001, the keyword vector is decomposed with respect to each attribute. In step S3002, the processing of the basic processing module 103, which was described in the first embodiment with reference to FIG. 18, is executed for each keyword, and the most suitable keyword with respect to each attribute is obtained.

Figure 31:
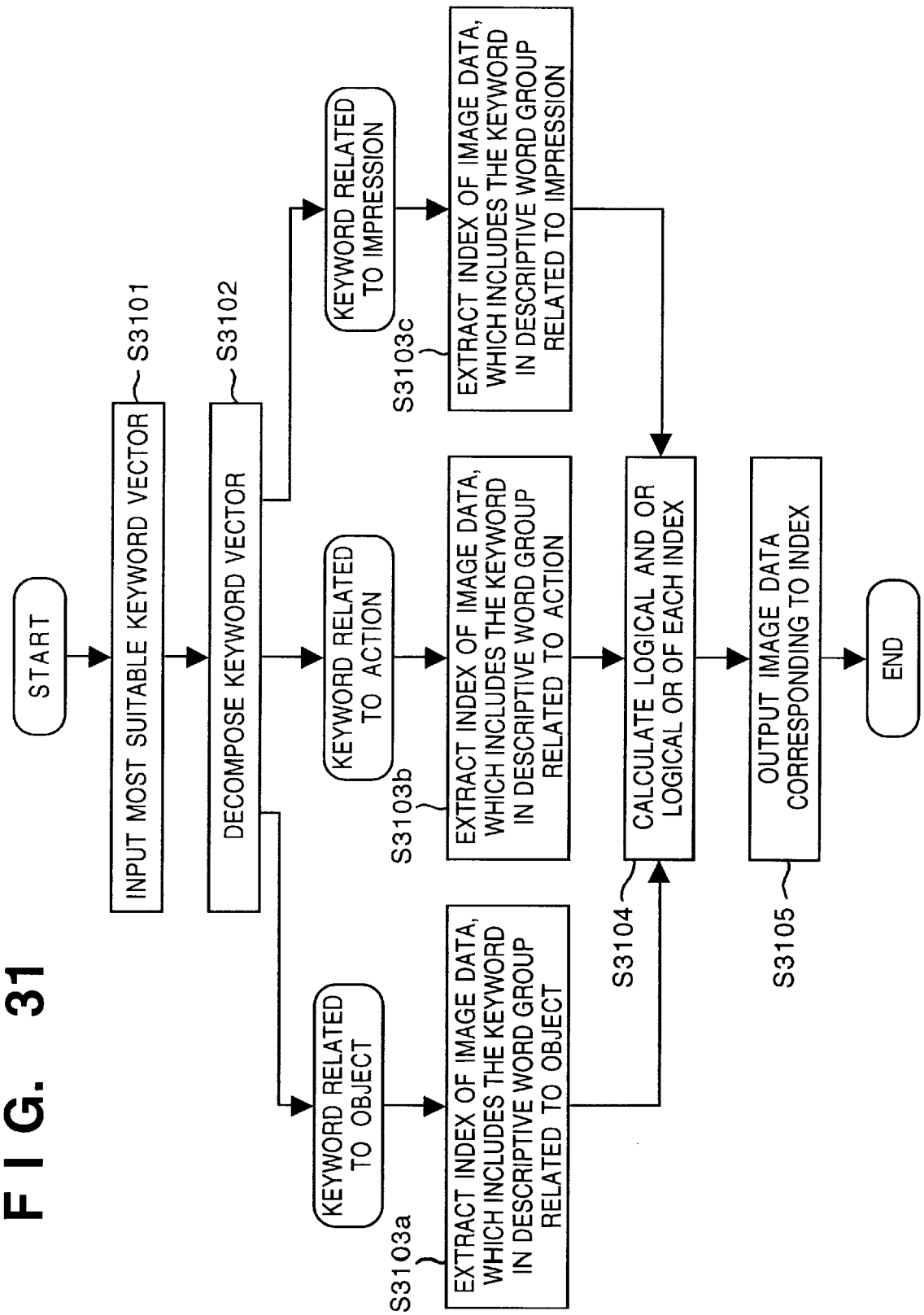
FIG. 31 is a flowchart showing the processing of the pattern matching engine.

The pattern matching engine 304 performs the following processing (FIG. 31).

In step S3101, a retrieving formula, constructed with the most suitable keyword vector group and retrieving symbols, is inputted. In step S3102, the given retrieving formula is decomposed with respect to each attribute. In step S3103, the following processes 1 to 5 are performed respectively for each attribute (object, action, impression and the like) to extract a data set.

Herein, the data set has, for instance, sequential numbers (index) assigned to the image data stored in the database, as its elements.

1. Initialize data set, indicative of the retrieved result, to an empty set.
2. Initialize a pointer of the retrieving formula to 1.
3. Read a retrieving symbol and a keyword, and set a pointer in the next position of the read retrieving symbol and the keyword.
4. Update the data set by retrieving operation performed by pattern matching based on the read retrieving symbol and keyword.
5. It is determined whether or not the pointer of the retrieving formula is pointing the last of the retrieving formula, and if so, the processing proceeds to step S3104. If not, the processing returns to the above step 3.

In step S3104, a product of the data set with respect to each attribute is calculated. In step S3105, the resultant set, or the set of image data which belongs to the set, is returned to the semantic retrieving engine 303.

Even if different users use the same expression to describe contents or impression of an image, each of the users may have different expectation for an image to be extracted. Moreover, when the same image is expressed, each user may use different expressions. Therefore, in order to perform correct retrieval operation for each user, a mechanism is necessary to handle individual differences. In the present embodiment, a learning function is provided.

It is understood that such individual differences occur because impressions of an image are different for each user, or because cognition of keywords used to describe the contents or impression of an image is different for each user. In the present embodiment, the former corresponds to an individual difference in an image vector and the latter corresponds to an individual difference in a keyword vector. In the learning function described below, Meta data of an image is considered to be a shared resource used by plural users, where correct definitions are made. When a context representing an impression or contents of an image is constructed, a keyword vector corresponding to a keyword group used by users is corrected for each user.

The above-described learning mechanism is realized in two levels of processing: moving the semantic center, and reflecting the amount of movement upon keywords.

Figure 32:
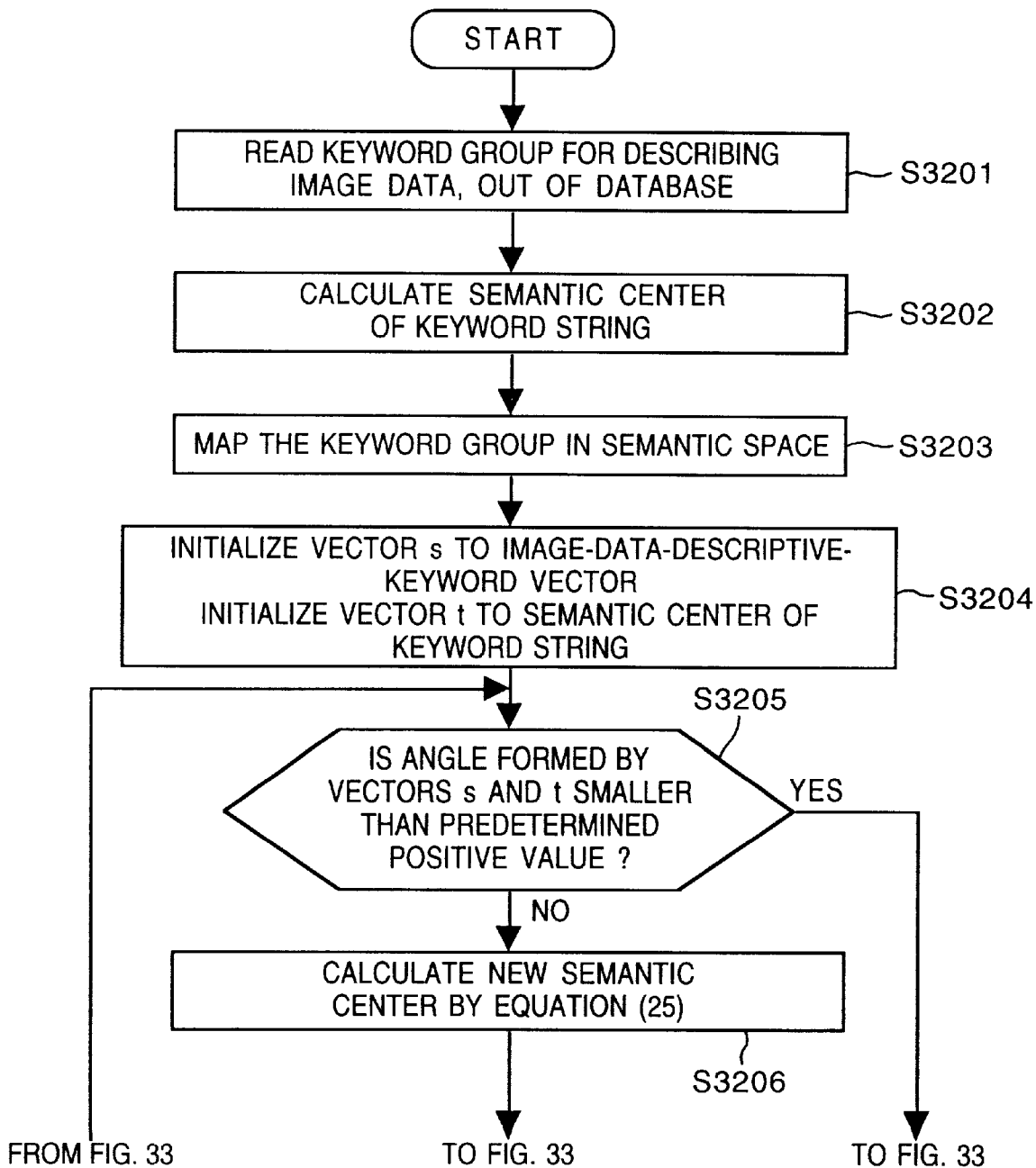
FIGS. 32 and 33 are flowcharts showing processing of calculating a moving amount of a semantic center by a learning mechanism.
Figure 33:
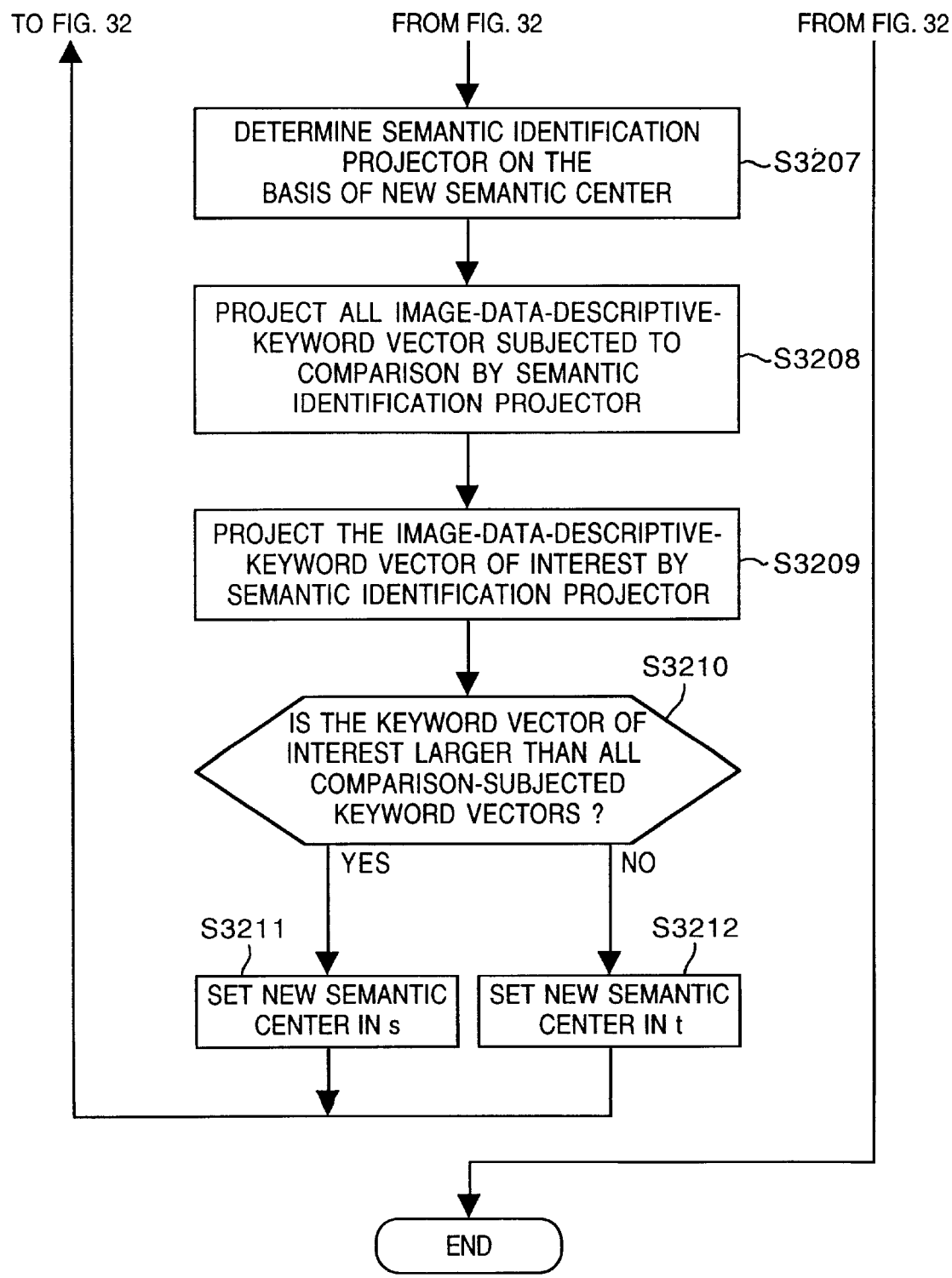

When a keyword string $s_L$, representing context indicative of the impression or contents of an image, and an image vector p, corresponding to an image $P_t$ having the highest correlation to the context are given, the semantic center G is moved such that the image $P_t$ and the context represented by the keyword string $s_L$ will have the highest correlation. This will be described with reference to the flowcharts in FIGS. 32 and 33.

First in step S3201, a keyword group for describing image data is read out of database and an appropriate positive value is set in δ.

In step S3202, the semantic center G ($s_L$) with respect to the keyword string $s_L$ is calculated.

In step S3203, the read-out keyword group is mapped in the semantic space. In step S3204, two variable vectors s and t are initialized by executing s←p and t←G($s_L$). In step S3205, if an angle θ formed by the vectors s and t is smaller than the predetermined δ, the processing ends. Herein, the angle θ is calculated by the following equation:

$$\theta = \cos^{-1}(<s>^T<t>) \tag{24}$$

where $<s>$ is a normalized vector of the vector s.

If the angle θ is not smaller than the predetermined δ, a candidate for a new semantic center $G(s_L)_{NEW}$ is calculated by the following equation in step S3206.

$$G(s_L)_{NEW} = \frac{\langle s \rangle + \langle t \rangle}{\|\langle s \rangle + \langle t \rangle\|} \tag{25}$$

Herein, $\|\cdot\|$ is a norm, which is the same type of norm (infinite norm) used to calculate the semantic center. In step S3207, the semantic identification projector D is selected on the basis of the new semantic center candidate $G(s_L)_{NEW}$.

In step S3208, all image vectors $<c>_j$ (including the image vector of interest) which are subjected to comparison are projected by the semantic identification projector D.

$$[C]_j = D<c>_j, (j=1, 2, \ldots, L) \tag{26}$$

In step S3209, a projection [p] of the image vector p of interest utilizing the semantic identification projector D, is calculated. In step S3210, it is determined if $[p] \geq [c]_j, \forall j$ is satisfied; and if it is satisfied, the processing proceeds to step S3211 where $s \leftarrow G(s_L)_{NEW}$ is executed. Otherwise, the processing proceeds to step S3212 where $t \leftarrow G(s_L)_{NEW}$ is executed, and the processing returns to step S3205.

Next, description will be provided with reference to the flowchart in FIG. 34, for the method of correcting a keyword vector, which constitutes the keyword string $s_L$ such that the semantic center, determined by the keyword string $s_L$ consisting of L number of keywords, becomes the new semantic center $G(s_L)_{NEW}$.

First in step S3401, a moving vector ΔG, moving from the original semantic center $G(s_L) = (g_1 g_2 \ldots g_p)$ obtained by the keyword string $s_L$, to the new semantic center $G(s_L)_{NEW} = (g_{n1} g_{n2} \ldots g_{np})$ calculated in the above-described method, is obtained.

$$\Delta G(s_L) = G(s_L)_{NEW} - G(s_L) \tag{27}$$

In step S3402, the moving amount $\Delta r_j$ of a keyword vector $r_j$ is calculated by the following equation.

$$\Delta r_j = \frac{1}{L} \|G(s_L)\| (\Delta G(s_L))_k \quad j = 1, 2, \ldots, l \tag{28}$$

where $\|\cdot\|$ is an infinite norm. Also, the following method is effective.

$$\Delta r_{j,k} = \eta_{j,k} \|G(s_L)\| (\Delta G(s_L))_k \tag{29}$$

where $$\eta_{j,k} = \begin{cases} |r_{j,k}| / \sum_{j=1}^{L} r_{j,k} & \sum_{j=1}^{L} |r_{j,k}| \neq 0 \\ 1/L & \sum_{j=1}^{L} |r_{j,k}| = 0 \end{cases} \quad (30)$$

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program. In this case, the program codes read from the storage medium realize the new functions according to the invention, and the storage medium storing the program codes constitutes the invention.

Further, the storage medium, such as a floppy disk, hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (Operating System) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion module which is connected to the computer, a CPU or the like contained in the function expansion card or module performs a part or entire process in accordance with designations of the program codes and realizes functions of the above embodiments.

In a case where the present invention is applied to the aforesaid storage medium, the storage medium stores program codes corresponding to the embodiments described in the embodiments.

The present invention is not limited to the above embodiments and various changes and modifications can be made within the spirit and scope of the present invention. Therefore, to appraise the public of the scope of the present invention, the following claims are made.

What is claimed is:

1. A semantic data processing apparatus comprising:

first inputting means for inputting a keyword for a retrieval and a context word group designating a field of the retrieval;

first transforming means for transforming the keyword inputted by said first inputting means into a keyword vector representing a meaning of the keyword in a semantic space which has axes corresponding to a predetermined characteristic word group;

second transforming means for transforming the context word group into a context word vector group by transforming each context word of the context word group inputted by said first inputting means into a vector representing a meaning of the context word in the semantic space;

projector generating means for generating a projector for projecting a vector in the semantic space into a subspace of the semantic space, the subspace comprising axes corresponding to characteristic words related to the context word group, based on the context word vector group obtained by said second transforming means;

second inputting means for inputting a comparison-subjected word group;

third transforming means for transforming the comparison-subjected word group into a comparison-subjected vector group by transforming each comparison-subjected word of the comparison-subjected word group inputted by said second inputting means into a vector representing a meaning of the comparison-subjected word in the semantic space;

projecting means for projecting the keyword vector and the comparison-subjected vector group in the subspace by utilizing the projector generated by said projector generating means;

calculating means for calculating a correlation amount in the subspace between each vector of the comparison-subjected vector group and the keyword vector; and retrieving means for retrieving at least one word from the comparison-subjected word group based on the correlation amount calculated by said calculating means.

2. The semantic data processing apparatus according to claim 1, wherein said selecting means rearranges words of the comparison-subjected word group in the order of the correlation amount with respect to each word and outputs the rearranged words.

3. The semantic data processing apparatus according to claim 1, wherein the correlation amount is a distance, and said selecting means selects, from the comparison-subjected word group, a comparison-subjected word having the minimum distance with respect to each word.

4. The semantic data processing apparatus according to claim 1, wherein said projector generating means calculates a semantic center of the context word vector group and generates the projector on the basis of the semantic center.

5. The semantic data processing apparatus according to claim 1, wherein said first, second and third transforming means transform each word into a vector corresponding to a combination of words which are utilized to describe a meaning of said word, with reference to a dictionary where meanings of words are described by the predetermined characteristic word group.

6. The semantic data processing apparatus according to claim 1, further comprising:

fourth transforming means for transforming the space generation word group into a space generation vector group by transforming each space generation word of the space generating word group into a space generation vector which has elements corresponding to a predetermined characteristic word group to represent a meaning of the space generation word; and semantic space generating means for generating a semantic space on the basis of the space generation vector group obtained by said fourth transforming means.

7. The semantic data processing apparatus according to claim 6, wherein said fourth transforming means transforms each word into a vector corresponding to a combination of words which are utilized to describe a meaning of said word, with reference to a dictionary where meanings of words are described by the predetermined characteristic word group.

8. The semantic data processing apparatus according to claim 6, wherein said semantic space generating means generates a correlation matrix on the basis of the space generation vector group, and creates a semantic space transformation matrix by subjecting the correlation matrix to singular-value decomposition, and said first, second and third transforming means perform transforming into a vector in the semantic space by utilizing the semantic space transformation matrix.

9. The semantic data processing apparatus according to claim 1, wherein said projector generating means comprises composite vector calculating means for calculating a composite vector of the context word vector group, and generates the projector on the basis of the composite vector.

10. The semantic data processing apparatus according to claim 9, wherein said composite vector calculating means calculates a mean vector, where the context word vector group is normalized, as the composite vector.

11. The semantic data processing apparatus according to claim 9, wherein the context word group is accompanied by a first operator operating on each context word and a second operator operating on a pair of context words, wherein the first operator operates at the time of transforming operation by said second transforming means, and the second operator operates at the time of calculating the composite vector by said composite vector calculating means.

12. The semantic data processing apparatus according to claim 1, wherein said projector generating means independently generates a projector for projecting the keyword vector and a projector for projecting the comparison-subjected vector group.

13. The semantic data processing apparatus according to claim 1, further comprising:

a database where the comparison-subjected group is applicable as a keyword; and retrieving means for retrieving a word from said database by utilizing, as a keyword, the comparison-subjected word selected by said selecting means.

14. The semantic data processing apparatus according to claim 13, wherein said database stores an image in correspondence with one or more keywords which represent contents or impression of the image.

15. The semantic data processing apparatus according to claim 14, further comprising correcting means for correcting, in accordance with a user, a keyword group inputted by a user in correspondence with a desired image by utilizing said first inputting means.

16. The semantic data processing apparatus according to claim 14, further comprising correction amount calculating means for calculating a correction amount to be corrected by said correcting means, on the basis of an image provided from said database and the keyword group selected by the user in correspondence with the image.

17. A semantic data processing method, comprising:

a first inputting step of inputting a keyword for a retrieval and a context word group designating a field of the retrieval;

a first transforming step of transforming the keyword inputted in said first inputting step into a keyword vector representing a meaning of the keyword in a semantic space, which has axes corresponding to a predetermined characteristic word group;

a second transforming step of transforming the context word group into a context word vector group by transforming each context word of the context word group inputted in said first inputting step into a vector representing a meaning of the context word in the semantic space;

a projector generating step of generating a projector for projecting a vector in the semantic space into a subspace of the semantic space, the subspace comprising axes corresponding to characteristic words related to the context word group, based on the context word vector group obtained in said second transforming step;

a second inputting step of inputting a comparison-subjected word group;

a third transforming step of transforming the comparison-subjected word group into the comparison-subjected vector group by transforming each comparison-subjected word of the comparison-subjected word group inputted in said second inputting step into a vector representing a meaning of the comparison-subjected word in the semantic space;

a projecting step of projecting the keyword vector and the comparison-subjected vector group in the subspace utilizing the projector generated in said projector generating step;

a calculating step of calculating a correlation mount in the subspace between each vector of the comparison-subjected vector group and the keyword vector; and a retrieving step of retrieving at least one word from the comparison-subjected word group based on the correlation amount calculated in said calculating step.

18. The semantic data processing method according to claim 17, wherein in said selecting step, words of the comparison-subjected word group are rearranged in the order of the correlation amount with respect to each word and outputted.

19. The semantic data processing method according to claim 17, wherein the correlation amount is a distance, and in said selecting step, a comparison-subjected word having the minimum distance with respect to each word is selected from the comparison-subjected word group.

20. The semantic data processing method according to claim 17, wherein in said projector generating step, a semantic center of the context word vector group is calculated and the projector is generated on the basis of the semantic center.

21. The semantic data processing method according to claim 17, wherein in said first, second and third transforming steps, each word is transformed into a vector corresponding to a combination of words which are utilized to describe a meaning of said word, with reference to a dictionary where meanings of words are described by the predetermined characteristic word group.

22. The semantic data processing method according to claim 17, further comprising:

a fourth transforming step of transforming the space generation word group into a space generation vector group by transforming each space generation word of the space generating word group into a space generation vector which has elements corresponding to a predetermined characteristic word group to represent a meaning of the space generation word; and a semantic space generating step of generating a semantic space on the basis of the space generation vector group obtained in said fourth transforming step.

23. The semantic data processing method according to claim 22, wherein in said fourth transforming step, each word is transformed into a vector corresponding to a combination of words which are utilized to describe a meaning of said word, with reference to a dictionary where meanings of words are described by the predetermined characteristic word group.

24. The semantic data processing method according to claim 22, wherein in said semantic space generating step, a correlation matrix is generated on the basis of the space generation vector group, and a semantic space transformation matrix is created by subjecting the correlation matrix to singular-value decomposition, and in said first, second and third transforming steps, transforming into a vector in the semantic space is performed by utilizing the semantic space transformation matrix.

25. The semantic data processing method according to claim 17, wherein said projector generating step includes a composite vector calculating step of calculating a composite vector of the context word vector group, wherein the projector is generated on the basis of the composite vector.

26. The semantic data processing method according to claim 25, wherein in said composite vector calculating step, a mean vector, where the context word vector group is normalized, is calculated as the composite vector.

27. The semantic data processing method according to claim 25, wherein the context word group is accompanied by a first operator operating on each context word and a second operator operating on a pair of context words, wherein the first operator operates at the time of transforming operation in said second transforming step, and the second operator operates at the time of calculating the composite vector in said composite vector calculating step.

28. The semantic data processing method according to claim 17, wherein in said projector generating step, a projector for projecting the keyword vector and a projector for projecting the comparison-subjected vector group are independently generated.

29. The semantic data processing method according to claim 28, wherein in said second inputting step, a keyword, which is applicable as the comparison-subjected word in a predetermined database, is inputted, said method further comprising a retrieving step of retrieving data from said database by utilizing, as a keyword, the comparison-subjected word selected in said selecting step.

30. The semantic data processing method according to claim 29, wherein said database stores an image in correspondence with one or more keywords which represent contents or impression of the image.

31. The semantic data processing method according to claim 30, further comprising a correcting step of correcting, in accordance with a user, a keyword group inputted by a user in correspondence with a desired image in said first inputting step.

32. The semantic data processing method according to claim 30, further comprising a correction amount calculating step of calculating a correction amount to be corrected in said correcting step, on the basis of an image provided from said database and the keyword group selected by the user in correspondence with the image.

33. A data retrieving method, comprising:

a projecting step of projecting a keyword vector representing a meaning of an inputted keyword for a retrieval in a semantic space and a comparison-subjected vector group representing a meaning of a comparison-subjected word group in the semantic space into a subspace of the semantic space by utilizing a predetermined projector; and a calculating step of calculating a correlation amount of each vector of the projected keyword vector and the projected comparison-subjected vector group; and a retrieving step of retrieving at least one word from the comparison-subjected word group based on a calculation result, wherein the predetermined projector is a projector for projecting a vector in the semantic space, which comprises axes corresponding to a predetermined characteristic word group, into the subspace, which comprises axes corresponding to characteristic words related to an inputted context word group designating a field of the retrieval, and is generated based on a context word vector group corresponding to the context word group.

34. A data retrieving apparatus comprising transforming means for transforming an inputted keyword to an internal data keyword to perform data retrieval operation, the transforming means comprising:

projecting means for projecting a keyword vector representing a meaning of the inputted keyword and a comparison-subjected vector group representing a meaning of a comparison-subjected word group in the semantic space into a subspace of the semantic space by utilizing a predetermined projector;

calculating means for calculating a correlation amount of each vector of the projected keyword vector and the projected comparison-subjected vector group; and selecting means for selecting a word as the data keyword, from the comparison-subjected word group based on a calculation result, wherein the predetermined projector is a projector for projecting a vector in the semantic space, which comprises axes corresponding to a predetermined characteristic word group, into the subspace, which comprises axes corresponding to characteristic words related to an inputted context word group designating a field of the retrieval, and is generated based on a context word vector group corresponding to the context word group.

35. A product comprising a computer readable medium storing a program for retrieving data, the program comprising:

program code for projecting a keyword vector representing a meaning of an inputted keyword for a retrieval in a semantic space and a comparison-subjected vector group representing a meaning of a comparison-subjected word group in the semantic space into a subspace of the semantic space utilizing a predetermined projector, the predetermined projector being a projector for projecting a vector in the semantic space, which comprises axes corresponding to a predetermined characteristic word group, into the subspace, which comprises axes corresponding to characteristic words related to an inputted context word group designating a field of the retrieval;

program code for calculating a correlation amount of each vector of the projected keyword vector and the projected comparison-subjected vector group; and program code for retrieving at least one word from the comparison-subjected word group based on a calculation result.

36. A product comprising a computer readable medium storing a program for processing semantic data, the program comprising:

program code for transforming an inputted keyword for a retrieval into a keyword vector representing a meaning of the keyword in a semantic space, which has axes corresponding to a predetermined characteristic word group, transforming an inputted context word group designating a field of the retrieval into a context word vector group representing a meaning of the context word group in the semantic space, and transforming an inputted comparison subjected word group into a comparison-subjected vector group representing a meaning of the comparison-subjected word group in the semantic space;

program code for generating a projector for projecting a vector in the semantic space into a subspace of the semantic space, the subspace comprising axes corresponding to characteristic words related to the context word group, based on a context word vector;

third program means for projecting the keyword vector and the comparison-subjected vector group into the subspace by utilizing the projector;

fourth program means for calculating a correlation amount in the subspace between each vector of the comparison-subjected vector group and the keyword vector; and fifth program means for retrieving at least one word from the comparison-subjected word group based on a calculated correlation amount.

* * * * *